US008233635B2

(12) United States Patent
Shiba

(10) Patent No.: US 8,233,635 B2
(45) Date of Patent: Jul. 31, 2012

(54) AUDIO SIGNAL TRANSMITTING APPARATUS, AUDIO SIGNAL RECEIVING APPARATUS, AUDIO SIGNAL TRANSMISSION SYSTEM, AUDIO SIGNAL TRANSMISSION METHOD, AND PROGRAM

(75) Inventor: Kenji Shiba, Tokyo (JP)

(73) Assignee: Sony Corporation, Tokyo (JP)

( * ) Notice: Subject to any disclaimer, the term of this patent is extended or adjusted under 35 U.S.C. 154(b) by 859 days.

(21) Appl. No.: 12/229,877

(22) Filed: Aug. 27, 2008

(65) Prior Publication Data

US 2009/0060220 A1 Mar. 5, 2009

(30) Foreign Application Priority Data

Aug. 31, 2007 (JP) ................................ 2007-225759

(51) Int. Cl.
*H04B 7/00* (2006.01)
*H04B 3/00* (2006.01)
*H04H 20/47* (2008.01)

(52) U.S. Cl. ........... 381/80; 381/2; 381/77; 348/E5.105; 348/E5.108; 348/E7.004; 348/E7.063; 370/535; 370/536; 375/219; 375/296; 455/402

(58) Field of Classification Search ................ 381/2, 77, 381/80; 370/535, 536; 375/219, 296; 455/402; 348/E5.105, E5.108, E7.004, E7.063
See application file for complete search history.

(56) References Cited

U.S. PATENT DOCUMENTS

| | | | | |
|---|---|---|---|---|
| 4,698,670 | A | 10/1987 | Matty | |
| 5,406,634 | A | 4/1995 | Anderson et al. | |
| 2004/0096074 | A1 | 5/2004 | Bontempi et al. | |
| 2004/0223622 | A1 | 11/2004 | Lindemann et al. | |
| 2004/0250273 | A1 * | 12/2004 | Swix et al. | 725/25 |
| 2005/0177256 | A1 | 8/2005 | Shintani et al. | |
| 2008/0045147 | A1 * | 2/2008 | Okuda | 455/15 |
| 2008/0311943 | A1 * | 12/2008 | Earl | 455/509 |
| 2009/0060206 | A1 * | 3/2009 | Shiba | 381/2 |
| 2009/0060219 | A1 | 3/2009 | Inohara | |
| 2011/0069783 | A1 * | 3/2011 | Kim et al. | 375/296 |

FOREIGN PATENT DOCUMENTS

| | | | |
|---|---|---|---|
| JP | 63-30032 | | 2/1988 |
| JP | 09-009364 | | 1/1997 |
| JP | 09-046799 | | 2/1997 |
| JP | 09-259539 | A | 10/1997 |
| JP | 10-174029 | | 6/1998 |
| JP | 11-164058 | | 6/1999 |
| JP | 2001-101822 | A | 4/2001 |
| JP | 2001-296875 | A | 10/2001 |
| JP | 2001-298680 | A | 10/2001 |
| JP | 2001-359200 | A | 12/2001 |
| JP | 2002-345070 | A | 11/2002 |
| JP | 2003-109298 | A | 4/2003 |

(Continued)

*Primary Examiner* — Dao H Nguyen
(74) *Attorney, Agent, or Firm* — Wolf, Greenfield & Sacks, P.C.

(57) ABSTRACT

According to the invention, there is provided an audio signal receiving apparatus which receives audio signals transmitted from external connection apparatuses through a plurality of channels, including an audio signal transmitting scheme determining unit which determines a transmitting scheme of the audio signal in the external connection apparatus on the basis of channel mapping information representing types of the audio signals transmitted by the external connection apparatuses. When the audio signal to be received is changed, a process to be executed is changed depending on the transmitting scheme of the audio signal.

4 Claims, 11 Drawing Sheets

FOREIGN PATENT DOCUMENTS

| | | | |
|---|---|---|---|
| JP | 2004-260281 | A | 9/2004 |
| JP | 2005-012534 | A | 1/2005 |
| JP | 2005-202052 | A | 7/2005 |
| JP | 2005-210504 | A | 8/2005 |
| JP | 2005-217559 | A | 8/2005 |
| JP | 2006-101081 | A | 4/2006 |
| JP | 2006-101496 | A | 4/2006 |
| JP | 2007-027928 | A | 2/2007 |
| JP | 2008-503147 | A | 1/2008 |
| JP | 2008-035400 | A | 2/2008 |

* cited by examiner

FIG.5A

| | | |
|---|---|---|
| CH1 | No.1 | MAIN CHANNEL 1 (L) |
| | No.2 | MAIN CHANNEL 1 (R) |
| CH2 | No.3 | SUB-CHANNEL 1 |
| | No.4 | SUB-CHANNEL 2 |
| CH3 | No.5 | SUB-CHANNEL 3 |
| | No.6 | SUB-CHANNEL 4 |
| CH4 | No.7 | SUB-CHANNEL 5 |
| | No.8 | SUB-CHANNEL 6 |

FIG.5B

| | | |
|---|---|---|
| CH1 | No.1 | MAIN CHANNEL 1 (L) |
| | No.2 | MAIN CHANNEL 1 (R) |
| CH2 | No.3 | MAIN CHANNEL 2 (L) |
| | No.4 | MAIN CHANNEL 2 (R) |
| CH3 | No.5 | MAIN CHANNEL 3 (L) |
| | No.6 | MAIN CHANNEL 3 (R) |
| CH4 | No.7 | MAIN CHANNEL 4 (L) |
| | No.8 | MAIN CHANNEL 4 (R) |

AUDIO SIGNAL TRANSMITTING APPARATUS, AUDIO SIGNAL RECEIVING APPARATUS, AUDIO SIGNAL TRANSMISSION SYSTEM, AUDIO SIGNAL TRANSMISSION METHOD, AND PROGRAM

CROSS-REFERENCE TO RELATED APPLICATION

The present invention contains subject matter related to Japanese Patent Application JP 2007-225759 filed in the Japan Patent Office on Aug. 31, 2007, the entire contents of which being incorporated herein by reference.

BACKGROUND OF THE INVENTION

1. Field of the Invention

The present invention relates an audio signal receiving apparatus, an audio signal transmitting apparatus, an audio signal transmission system, an audio signal transmission method, and a program.

2. Description of the Related Art

In recent years, with popularization of a home theater system and development of an information transmission technique, a technique that transmits an audio signal by using a plurality of channels has been actively used. In the home theater system, an apparatus (to be also referred to as an audio signal transmitting apparatus hereinafter) which transmits an audio signal and an apparatus (to be also referred to as an audio signal receiving apparatus hereinafter) which receives an audio signal are often connected to each other through various connection cables.

In order to increase the degree of freedom of a layout of a plurality of loudspeakers configuring a home theater system, a so-called wireless connection between a transmitting apparatus and a loudspeaker serving as a receiving apparatus has been attempted without using a connection cable.

In order to realize the wireless connection, a method of transmitting an audio signal by using an infrared ray is disclosed (for example, see Japanese Patent Application Laid-Open No. 2007-27928).

SUMMARY OF THE INVENTION

However, in the method described in Japanese Patent Application Laid-Open No. 2007-27928, since a band used in signal transmission is an infrared region, an audio signal can be hardly transmitted due to the presence of a hindrance between a transmitting apparatus and a receiving apparatus.

In the past, an audio signal receiving apparatus (sub-unit) merely receives an audio signal transmitted from an audio signal transmitting apparatus (main unit). A user can hardly perform any operation (for example, a switching operation or the like of audio signals which are being transmitted) to the audio signal transmitting apparatus by operating the audio signal receiving apparatus.

Therefore, the present invention has been made in consideration of the above circumstances. It is desirable to provide an audio signal receiving apparatus, an audio signal transmitting apparatus, an audio signal transmission system, an audio signal transmission method, and a program which are novel and improved and can switch audio signals transmitted by a main unit by operating a sub-unit which receives audio signals.

According to an embodiment of the present invention, there is provided an audio signal receiving apparatus which receives audio signals transmitted from external connection apparatuses through a plurality of channels, including: a connection management information receiving unit which receives connection management information including channel mapping information representing a type of the audio signal transmitted by the external connection apparatus from the external connection apparatus; an audio signal transmitting scheme determining unit which determines a transmitting scheme of the audio signal in the external connection apparatus on the basis of the channel mapping information; an audio signal receiving unit which receives the audio signal from the external connection apparatus on the basis of the channel mapping information; and a desirably acquired signal notifying unit which notifies the external connection apparatus of a change request of the transmitted audio signal, and wherein the transmitting scheme of the audio signal is a first transmitting scheme which allocates and transmits a surround signal included in a plurality of audio signals acquired from a single sound source to at least one of the plurality of channels in a change of the received audio signal, the desirably acquired signal notifying unit which notifies the external connection apparatus of a change request of the audio signal transmitted by a channel which transmits the audio signal acquired from the single sound source, and when the transmitting scheme of the audio signal is a second transmitting scheme which allocates and transmits audio signals acquired from a plurality of sound sources to the plurality of channels of each of the sound sources in the change of the received audio signal, the audio signal receiving unit changes the channels of the audio signals received from the external connection apparatus.

The connection management information receiving unit may receive channel information related to the channel to which the audio signal receiving unit can be connected from the external connection apparatus, and the audio signal receiving unit may acquire the audio signal on the basis of the channel mapping information and the channel information.

When the received audio signals is changed, after the audio signal receiving unit confirms all the audio signals transmitted through the plurality of channels, the desirably acquired signal notifying unit may communicate with the external connection apparatus to confirm the presence/absence of an audio signal which is not transmitted yet by the external connection apparatus, the desirably acquired signal notifying unit may notify the external connection apparatus of a change request of the audio signals transmitted through the plurality of channels when the audio signal which is not transmitted yet is present, and the audio signal receiving unit may change the channels of the audio signals received from the external connection apparatus when the audio signal which is not transmitted yet is absent.

According to another embodiment of the present invention, there is provided an audio signal transmitting apparatus which transmits audio signals to external connection apparatuses through a plurality of channels, including: a connection management information transmitting unit which transmits connection management information including channel mapping information representing types of the audio signals transmitted through the plurality of channels to the external connection apparatus connected to the audio signal transmitting apparatus; an external connection apparatus transmitting information acquiring unit which receives external connection apparatus transmitting information transmitted from the external connection apparatus; a channel mapping information generating unit which generates the channel mapping information which reflects the external connection apparatus transmitting information on the basis of the external connection apparatus transmitting information; and an audio signal transmitting unit which transmits the audio signal to an external connection apparatus connected to the audio signal transmitting apparatus depending on the channel mapping information.

The audio signal transmitting apparatus may further include a channel management unit which manages connection states of the external connection apparatuses including the number of external connection apparatuses which receive the audio signals through the plurality of channels.

The audio signal transmitting apparatus further includes an external connection apparatus transmitting information acquiring unit which receives external connection apparatus transmitting information transmitted from the external connection apparatus, and the channel management unit may manage the plurality of channels on the basis of the external connection apparatus transmitting information.

The channel mapping information generating unit may acquire the number of external connection apparatuses which receive the audio signals from the channel management unit and update the channel mapping information of the channel having a small number of external connection apparatuses which receive the audio signals from the channels.

When the number of audio signals which can be transmitted is larger than the number of channels, and when the external connection apparatus transmitting information acquiring unit acquires a change request of the audio signals from the external connection apparatus, the channel mapping information generating unit may update the channel mapping information to allocate the untransmitted audio signals to any one of the plurality of channels.

The connection management information transmitting unit may transmit the connection management information further including channel information related to the channel to which the external connection apparatus can be connected to the external connection apparatus.

When a transmitting scheme of the audio signal in the audio signal transmitting apparatus is a scheme that transmits the audio signals acquired from a plurality of sound sources through the plurality of channels, the channel mapping information generating unit may change the channel mapping information after the external connection apparatus transmitting information acquiring unit acquires a change request of the audio signals from the external connection apparatuses.

According to still another embodiment of the present invention, there is provided an audio signal transmission system which includes an audio signal transmitting apparatus which transmits audio signals to external connection apparatuses through a plurality of channels and an audio signal receiving apparatus which receives the audio signals transmitted from the audio signal transmitting apparatus, wherein the audio signal transmitting apparatus includes: a connection management information transmitting unit which transmits connection management information including channel mapping information representing types of the audio signals transmitted through the plurality of channels to the external connection apparatus connected to the audio signal transmitting apparatus and including the audio signal receiving apparatus; an external connection apparatus transmitting information acquiring unit which receives external connection apparatus transmitting information transmitted from the external connection apparatus; a channel mapping information generating unit which generates the channel mapping information which reflects the external connection apparatus transmitting information on the basis of the external connection apparatus transmitting information; and an audio signal transmitting unit which transmits the audio signal to an external connection apparatus connected to the audio signal transmitting apparatus depending on the channel mapping information, the audio signal receiving apparatus includes: a connection management information receiving unit which receives connection management information including channel mapping information representing a type of the audio signal transmitted by the external connection apparatus from the external connection apparatus; an audio signal transmitting scheme determining unit which determines a transmitting scheme of the audio signal in the external connection apparatus on the basis of the channel mapping information; an audio signal receiving unit which receives the audio signal from the external connection apparatus on the basis of the channel mapping information; and a desirably acquired signal notifying unit which notifies the external connection apparatus of a change request of the transmitted audio signal, when the transmitting scheme of the audio signal is a first transmitting scheme which allocates and transmits a surround signal included in a plurality of audio signals acquired from a single sound source to at least one of the plurality of channels in a change of the received audio signal, the desirably acquired signal notifying unit which notifies the audio signal transmitting apparatus of a change request of the audio signal transmitted by a channel which transmits the audio signal acquired from the single sound source, and when the transmitting scheme of the audio signal is a second transmitting scheme which allocates and transmits audio signals acquired from a plurality of sound sources to the plurality of channels of each of the sound sources in the change of the received audio signal, the audio signal receiving unit changes the channels of the audio signals received from the audio signal transmitting apparatus.

According to still another embodiment of the present invention, there is provided an audio signal transmission method which transmits an audio signal by an audio signal transmission system including an audio signal transmitting apparatus which transmits audio signals to external connection apparatuses through a plurality of channels and an audio signal receiving apparatus which receives the audio signal transmitted from the audio signal transmitting apparatus, including the steps of: transmitting connection management information including channel mapping information representing types of the audio signals transmitted through the plurality of channels to the external connection apparatus connected to the audio signal transmitting apparatus and including the audio signal receiving apparatus; transmitting the audio signal to the external connection apparatus connected to the audio signal transmitting apparatus depending on the channel mapping information; and changing the channel mapping information when the audio signal transmitting apparatus acquires a change request of the audio signal from the external connection apparatus.

According to still another embodiment of the present invention, there is provided a program which causes a computer to function as an audio signal receiving apparatus which receives audio signals transmitted from external connection apparatuses through a plurality of channels, causing the computer to realize: a connection management information receiving function that receives connection management information including channel mapping information representing a type of the audio signal transmitted by the external connection apparatus from the external connection apparatus; the audio signal transmitting scheme determining function that determines a transmitting scheme of the audio signal in the external connection apparatus on the basis of the channel mapping information; an audio signal receiving function that receives the audio signal from the external connection apparatus on the basis of the channel mapping information; and a desirably acquired signal notifying function that notifies the external connection apparatus of a change request of the transmitted audio signal.

According to the configuration, the computer program is stored in a storage unit included in the computer and loaded on and executed by a CPU included in the computer, so that the computer functions as the audio signal transmitting apparatus. A computer readable recording medium on which the computer program is recorded can also be provided. The recording medium is, for example, a magnetic disk, an optical disk, a magnetooptical disk, a flash memory, or the like. The computer program may be delivered through, for example, a network without using a recording medium.

According to still another embodiment of the present invention, there is provided a program which causes a computer to function as an audio signal transmitting apparatus which transmits audio signals to external connection apparatuses through a plurality of channels, causing the computer to realize: a connection management information transmitting scheme that transmits connection management information including channel mapping information representing types of the audio signals transmitted through the plurality of channels to the external connection apparatus connected to the audio signal transmitting apparatus; an external connection apparatus transmitting information acquiring function that receives external connection apparatus transmitting information transmitted from the external connection apparatus; a channel mapping information generating function that generates the channel mapping information which reflects the external connection apparatus transmitting information on the basis of the external connection apparatus transmitting information; and an audio signal transmitting function that transmits the audio signal to the external connection apparatus connected to the audio signal transmitting apparatus depending on the channel mapping information.

According to the configuration, the computer program is stored in a storage unit included in the computer and loaded on and executed by a CPU included in the computer, so that the computer functions as the audio signal transmitting apparatus. A computer readable recording medium on which the computer program is recorded can also be provided. The recording medium is, for example, a magnetic disk, an optical disk, a magnetooptical disk, a flash memory, or the like. The computer program may be delivered through, for example, a network without using a recording medium.

According to the embodiments of the present invention described above, since an audio signal transmitting apparatus serving as a main unit and an audio signal receiving apparatus serving as a sub-unit can perform not only transmission/reception of audio signals but also interactive data communication between the main unit and the sub-unit, audio signals transmitted by the main unit can be switched by operating the sub-unit which receives the audio signals.

BRIEF DESCRIPTION OF THE DRAWINGS

FIG. 5A is an explanatory diagram for explaining an example of channel mapping information according to the embodiment;

FIG. 5B is an explanatory diagram for explaining an example of the channel mapping information according to the embodiment;

DETAILED DESCRIPTION OF THE PREFERRED EMBODIMENTS

Figure 1:
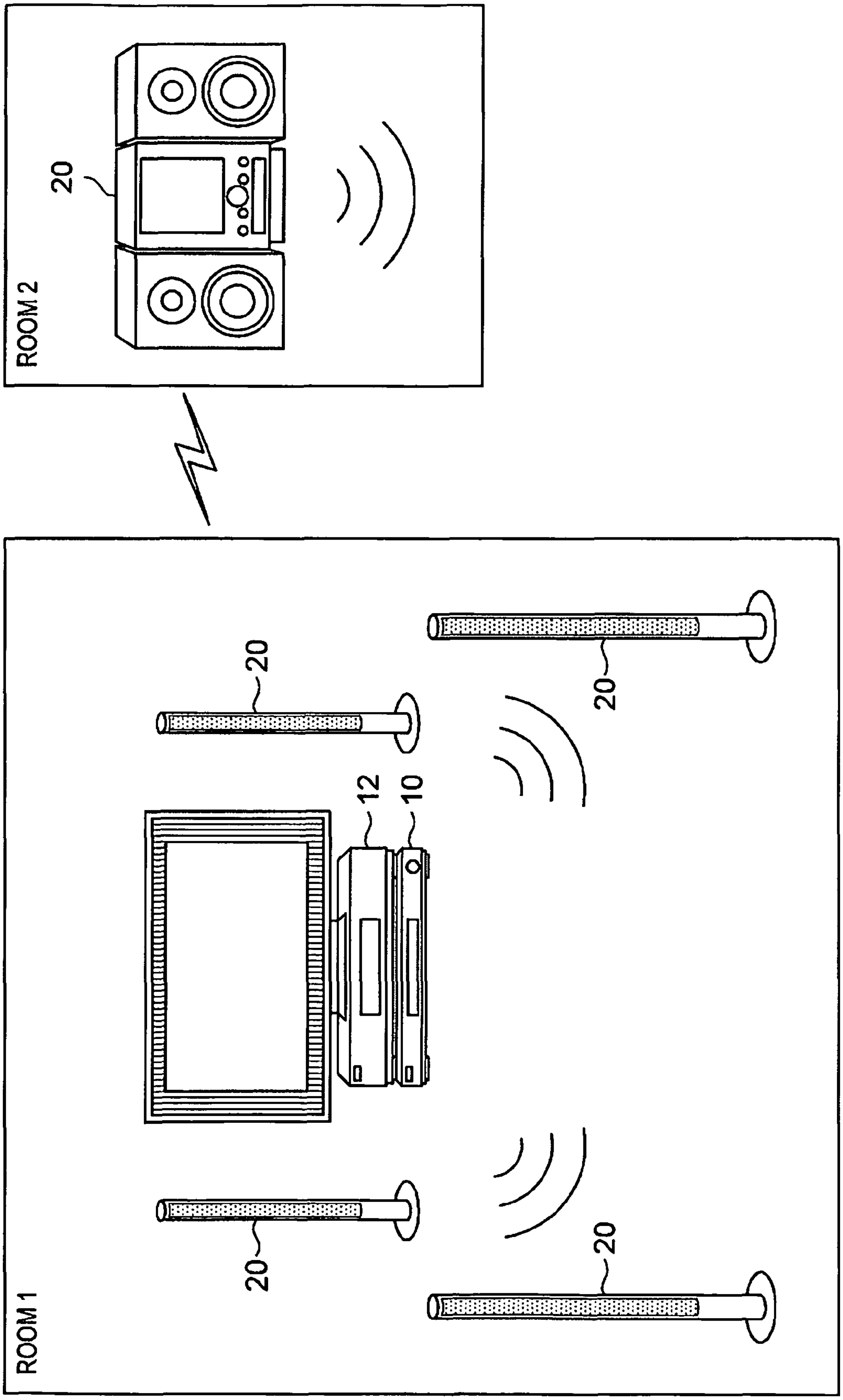
FIG. 1 is an explanatory diagram for explaining an entire configuration of an audio signal transmission system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[First Embodiment]

(Outline of Audio Signal Transmission System 1)

An outline of an audio signal transmission system 1 according to a first embodiment of the present invention will be described below in detail with reference to FIG. 1. FIG. 1 is an explanatory diagram showing an entire configuration of the audio signal transmission system 1 according to the embodiment.

As shown in FIG. 1, the audio signal transmission system 1 according to the embodiment includes an audio signal transmitting apparatus 10 and audio signal receiving apparatuses 20.

The audio signal transmitting apparatus 10 wirelessly transmits an audio signal to the audio signal receiving apparatus 20 and receives various pieces of information transmitted from the audio signal receiving apparatus 20. The audio signal transmitting apparatus 10 may acquire an audio signal to be wirelessly transmitted from, for example, an audio signal output device 12 such as a DVD player or a Blu-ray disk (to be abbreviated as a BD hereinafter), and the audio signal transmitting apparatus 10 itself may have a function of the audio signal output device. The audio signal transmitting apparatus 10 and the audio signal receiving apparatus 20 perform transmission of an audio signal or interactive data communication of various pieces of information by using, for example, a radio wave band. For this reason, the audio signal transmitting apparatus 10 and the audio signal receiving apparatus 20, as shown in FIG. 1, may be arranged in the same room or may be separately arranged in different rooms, respectively.

The audio signal receiving apparatus 20 receives an audio signal transmitted from the audio signal transmitting apparatus 10 and transmits information related to a connection of the audio signal receiving apparatus 20 and various pieces of information such as a desirably changing notice of an audio signal to be transmitted. The audio signal receiving apparatus 20, as shown in ROOM 1 in FIG. 1, a surround speaker group wirelessly connected to the audio signal transmitting apparatus 10 may be used, or as shown in ROOM 2 in FIG. 1, an audio signal output device such as an audio component which outputs an audio signal transmitted from the audio signal transmitting apparatus 10 may be used. The audio signal receiving apparatus 20 may be an audio signal acquiring device such as headphones or an earphone.

In the audio signal transmission system 1 according to the embodiment, the audio signal transmitting apparatus 10 confirms the presence/absence of the audio signal receiving apparatus 20 connected to the audio signal transmitting apparatus 10 at predetermined time intervals. When an output state of an audio signal is changed due to connection of a new external connection apparatus such as headphones to the audio signal receiving apparatus 20 or when a user executes some operation to the audio signal receiving apparatus 20, the audio signal receiving apparatus 20 transmits the information representing the effect to the audio signal transmitting apparatus 10. For this reason, the audio signal transmitting apparatus 10 can automatically recognize various operations performed in the audio signal receiving apparatus 20. Since interactive data communication can be performed between the audio signal transmitting apparatus 10 and the audio signal receiving apparatus 20, the audio signal receiving apparatus 20 is operated to make it possible to change operation states of the audio signal transmitting apparatus 10.

In the above explanation, the audio signal transmitting apparatus 10 and the audio signal receiving apparatus 20 are wirelessly connected to each other through wireless connection (radio wave or the like) in, for example, a predetermined band. However, the present invention is not limited to the above case. For example, the audio signal transmitting apparatus 10 and the audio signal receiving apparatus 20 may be connected to each other by Power Line Communications (PLC) or the like.

(Hardware Configuration of Audio Signal Transmitting Apparatus 10)

Figure 2:
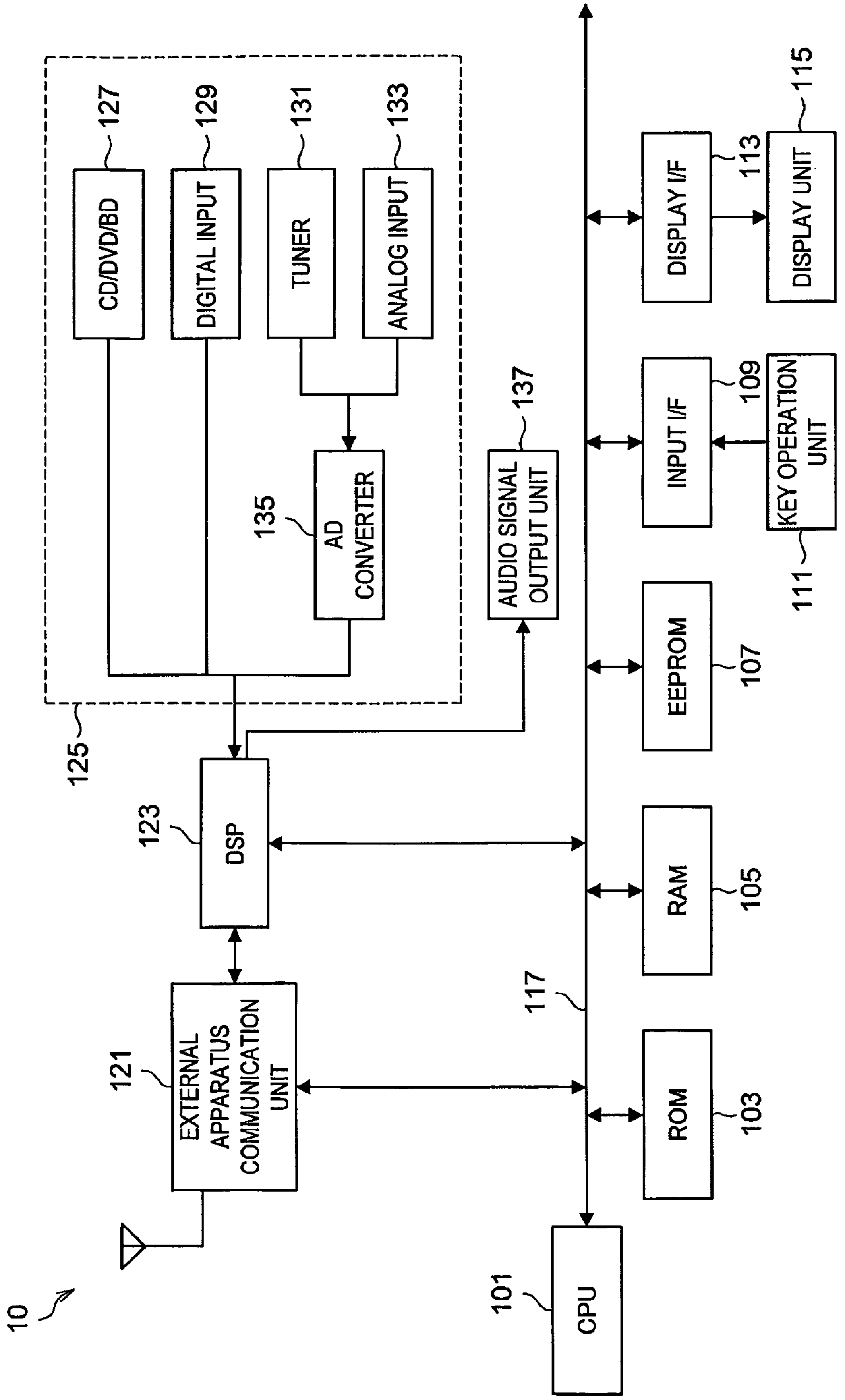
FIG. 2 is a block diagram showing a hardware configuration of an audio signal transmitting apparatus according to the embodiment.

A hardware configuration of the audio signal transmitting apparatus 10 according to the embodiment will be described below with reference to FIG. 2. FIG. 2 is a block diagram showing the hardware configuration of the audio signal transmitting apparatus 10 according to the embodiment.

As shown in FIG. 2, the audio signal transmitting apparatus 10 according to the embodiment includes a CPU (Central Processing Unit) 101, an ROM (Read Only Memory) 103, a RAM (Random Access Memory) 105, an EEPROM (Electronically Erasable and Programmable Read Only Memory) 107, an input interface (I/F) 109, a display interface (I/F) 113, and an external apparatus communication unit 121.

A DSP (Digital Signal Processor) 123 is connected to the external apparatus communication unit 121.

The CPU 101 functions as an arithmetic processing unit and a control unit and controls an entire operation or a part of the operation in the audio signal transmitting apparatus 10 according to various programs recorded on the ROM 103, the RAM 105, the EEPROM 107, and the like. The ROM 103 and the EEPROM 107 store a program, an operation parameter, and the like used by the CPU 101. The RAM 105 temporarily stores a program used in execution of the CPU 101, a parameter properly changed in the execution, and the like. These components are connected to each other by a host bus including an internal bus such as a CPU bus and a system bus 117 including an external bus such as a PCI (Peripheral Component Interconnect/Interface) bus.

The input interface 109 is an interface which includes an input control circuit or the like which generates an input signal on the basis of information input by user by means of the key operation unit 111 and outputs the input signal to the CPU 101. The user of the audio signal transmitting apparatus 10 can input various data or designate a processing operation to the audio signal transmitting apparatus 10 by operating the key operation unit 111 described below.

The key operation unit 111 is an operation unit which inputs various data or designates a processing operation to the audio signal transmitting apparatus 10. The key operation unit 111, for example, is an operation unit such as a mouse, a keyboard, a touch panel, a button, a switch, or a lever which operated by a user. The key operation unit 111, for example, may be a remote control unit (so-called remote controller) using an infrared ray or other radio waves or an external connection apparatus such as a mobile phone or a PDA corresponding to an operation of the audio signal transmitting apparatus 10.

The display interface 113 is an interface to transmit an output signal output from the CPU 101 to the display unit 115 (will be described later). The display unit 115, for example, includes a display device such as a CRT display device, a liquid crystal display device, a plasma display device, an EL display device, or a lamp which can visually notify a user of various pieces of information.

The external apparatus communication unit 121, for example, is a communication interface including a communication device or the like to communicate with the audio signal receiving apparatus 20 or various audio signal output devices. The external apparatus communication unit 121 may be an interface conforming to a general wireless audio transmission rule or an interface conforming to a specific wireless audio transmission rule. As the external apparatus communication unit 121, as a matter of course, for example, may be an external output terminal (not shown) to perform data communication with the audio signal transmitting apparatus 10 by wire through a cable or the like. The audio signal transmitting apparatus 10 according to the embodiment transmits an audio signal to the audio signal receiving apparatus 20 through the external apparatus communication unit 121 and performs interactive data communication with the audio signal receiving apparatus 20.

The DSP 123 is a CPU specialized for various processes for an audio signal or an image signal. To the DSP 123, an audio signal input unit 125 to which an audio signal used in transmission is input and an audio signal output unit 137 which outputs the acquired audio signal are connected.

The audio signal input unit 125 is a processing unit to which an audio signal used in transmission by the audio signal transmitting apparatus 10 according to the embodiment is input. The audio signal input unit 125, for example, includes a CD/DVD/BD 127, a digital input 129 to which a digital device such as an MD (Mini Disk) is connected, a tuner (TUNER) 131, an analog input 133 to which an analog device such as a cassette tape recorder or a record player is connected, and the like. Audio signals input from the tuner 131 and the analog input 133 are converted from analog signals to digital signals by the AD converter 135. The audio signal input by the audio signal input unit 125 is transmitted to the audio signal receiving apparatus 20 through the DSP 123 and the external apparatus communication unit 121.

The audio signal output unit 137 is a processing unit which outputs the audio signal input from the audio signal input unit 125 to the outside of the audio signal transmitting apparatus 10. The audio signal output unit 137 includes, for example, a DA converter (not shown) which converts an audio signal serving as a digital signal into an analog signal, an amplification unit (not shown) which amplifies the audio signal converted into the analog signal, a loudspeaker (not shown) which outputs the amplified audio signal, and the like.

The audio signal transmitting apparatus 10 according to the embodiment may include, in addition to the above configuration, for example, a storage device (not shown), a drive (not shown), and the like.

The storage device is a data storage device configured as an example of a storage unit of the audio signal transmitting apparatus 10 according to the embodiment, and the storage device includes, for example, a magnetic storage unit device such as an HDD (Hard Disk Drive), a semiconductor memory device, an optical memory device, a magnetooptical storage device, and the like. The storage device can store a program executed by the CPU 101, various data, an audio signal acquired from the outside, and the like.

The drive is a reader/writer for a storage medium which is incorporated or externally attached to the audio signal transmitting apparatus 10. The drive reads information recorded on a removal recording medium such as a loaded magnetic disk, an optical disk, a magnetooptical disk, or a semiconductor memory and outputs the information to the RAM 105. The drive can also write a record in a removal recording medium such as a loaded magnetic disk, an optical disk, a magnetooptical disk, or a semiconductor memory. The removal recording medium, for example, is a DVD media, an HD-DVD media, a Blu-ray media, a compact flash (registered trademark) (CompactFlash: CF), a memory stick, an SD memory card (Secure Digital memory card), or the like. The removal recording medium, for example, may be an IC card (Integrated Circuit card) on which a noncontact IC chip is mounted, an electronic device, or the like.

With the above configuration described above, the audio signal transmitting apparatus 10 acquires audio signals from various audio signal output sources, makes it possible to transmit the audio signal to the audio signal receiving apparatus 20 through the external apparatus communication unit 121, and can perform interactive data communication with the audio signal receiving apparatus 20.

An example of the hardware configuration which can realize the function of the audio signal transmitting apparatus 10 according to the embodiment is described above. The constituent elements may be configured by using general-purpose members or may include hardware specialized for the functions of the constituent elements. Therefore, depending on a technological level obtained each time the embodiment is executed, hardware configurations to be used can be arbitrarily changed.

(Hardware Configuration of Audio Signal Receiving Apparatus 20)

Figure 3:
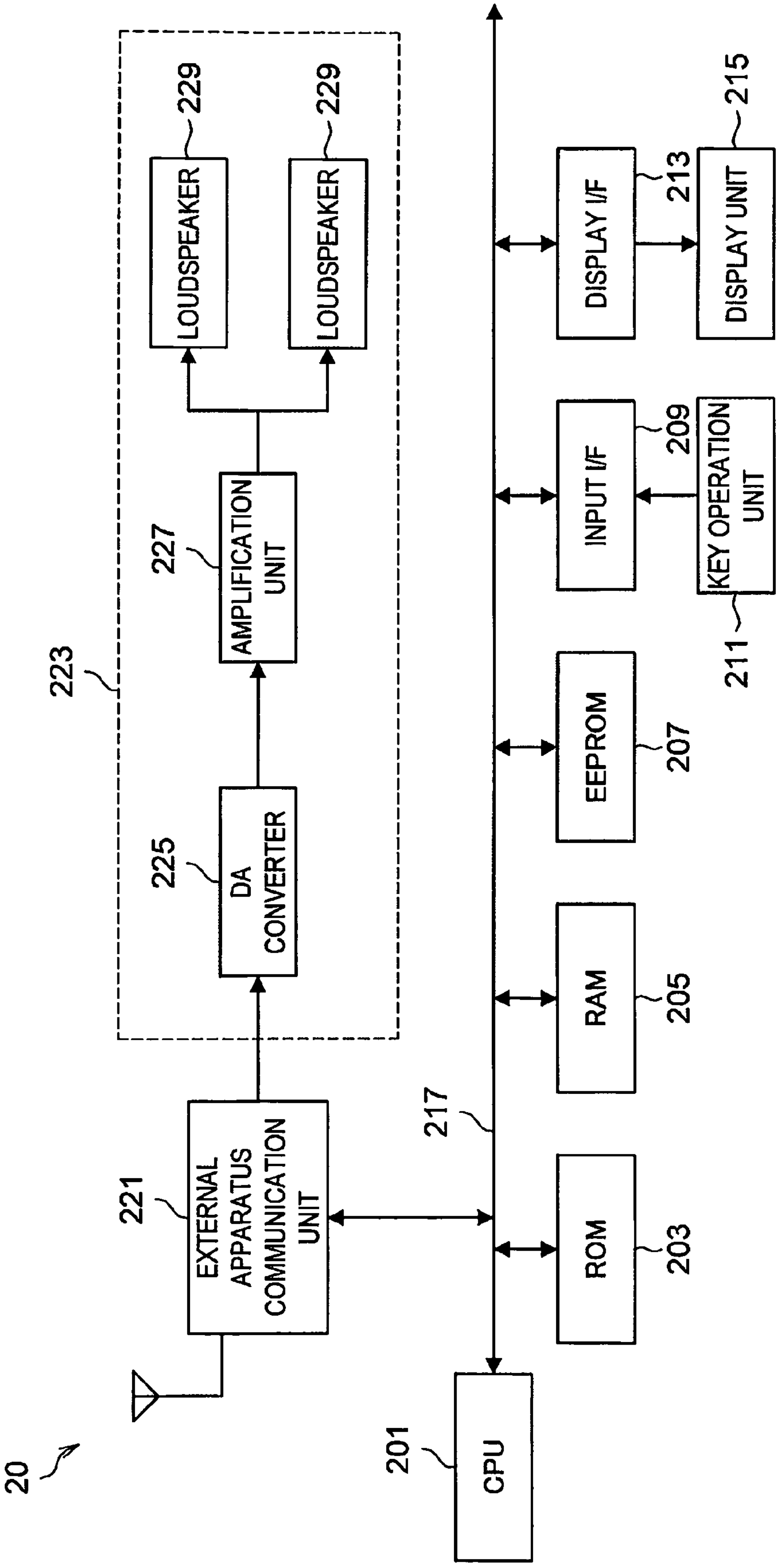
FIG. 3 is a block diagram showing a hardware configuration of an audio signal receiving apparatus according the embodiment.

Subsequently, with reference to FIG. 3, a hardware configuration of the audio signal receiving apparatus 20 according to the embodiment will be described in detail. FIG. 3 is a block diagram showing the hardware configuration of the audio signal receiving apparatus 20 according to the embodiment.

As shown in FIG. 3, the audio signal receiving apparatus 20 according to the embodiment includes a CPU 201, a ROM 203, a RAM 205, an EEPROM 207, an input interface (I/F) 209, a display interface (I/F) 213, and an external apparatus communication unit 221.

To the external apparatus communication unit 221, an audio signal output unit 223 which outputs a received audio signal is connected.

The CPU 201 functions as an arithmetic processing unit and a control unit and controls an entire operation or a part of the operation in the audio signal receiving apparatus 20 according to various programs recorded on the ROM 203, the RAM 205, the EEPROM 207, and the like. The ROM 203 and the EEPROM 207 store a program, an operation parameter, and the like used by the CPU 201. The RAM 205 temporarily stores a program used in execution of the CPU 201, a parameter properly changed in the execution, and the like. These components are connected to each other by a host bus including an internal bus such as a CPU bus and a system bus 217 including an external bus such as a PCI bus.

The input interface 209 is an interface which includes an input control circuit or the like which generates an input signal on the basis of information input by user by means of a key operation unit 211 and outputs the input signal to the CPU 201. The user of the audio signal receiving apparatus 20 can input various data or designate a processing operation to the audio signal receiving apparatus 20 by operating the key operation unit 211 described below.

The key operation unit 211 is an operation unit which inputs various data or designates a processing operation to the audio signal receiving apparatus 20. The key operation unit 211, for example, is an operation unit such as a mouse, a keyboard, a touch panel, a button, a switch, or a lever which operated by a user. The key operation unit 211, for example, may be a remote control unit (so-called remote controller) using an infrared ray or other radio waves or an external connection apparatus such as a mobile phone or a PDA corresponding to an operation of the audio signal receiving apparatus 20.

The display interface 213 is an interface to transmit an output signal output from the CPU 201 to a display unit 215 (will be described later). The display unit 215, for example, includes a display device such as a CRT display device, a liquid crystal display device, a plasma display device, an EL display device, or a lamp which can visually notify a user of various pieces of information.

The external apparatus communication unit 221, for example, is a communication interface including a communication device or the like to communicate with the audio signal transmitting apparatus 10 or various audio signal output devices. The external apparatus communication unit 221 may be an interface conforming to a general wireless audio transmission rule or an interface conforming to a specific wireless audio transmission rule. As the external apparatus communication unit 221, as a matter of course, for example, may be an external output terminal (not shown) to perform data communication with the audio signal transmitting apparatus 10 by wire through a cable or the like. The audio signal receiving apparatus 20 according to the embodiment receives an audio signal from the audio signal transmitting apparatus 10 through the external apparatus communication unit 221 and performs interactive data communication with the audio signal transmitting apparatus 10.

The audio signal output unit 223 is a processing unit which outputs an audio signal transmitted from the audio signal transmitting apparatus 10. The audio signal output unit 223, as shown in FIG. 3, includes, for example, a DA converter 225, an amplification unit 227, and a loudspeaker 229.

The DA converter 225 converts the received audio signal from a digital signal to an analog signal. The audio signal converted into the analog signal is amplified by the amplification unit 227 and output from the loudspeaker 229.

The audio signal receiving apparatus 20 according to the embodiment may include a DSP and an audio signal input unit included in the audio signal transmitting apparatus 10 according to the embodiment. Furthermore, the audio signal receiving apparatus 20 may include, in addition to the above configuration, for example, a storage device (not shown), a drive (not shown), and the like.

The storage device is a data storage device configured as an example of a storage unit of the audio signal receiving apparatus 20 according to the embodiment, and the storage device includes, for example, a magnetic storage unit device such as an HDD (Hard Disk Drive), a semiconductor memory device, an optical memory device, a magnetooptical storage device, and the like. The storage device can store a program executed by the CPU 201, various data, an audio signal acquired from the outside, and the like.

The drive is a reader/writer for a storage medium which is incorporated or externally attached to the audio signal receiving apparatus 20. The drive reads information recorded on a removal recording medium such as a loaded magnetic disk, an optical disk, a magnetooptical disk, or a semiconductor memory and outputs the information to the RAM 205. The drive can also write a record in a removal recording medium such as a loaded magnetic disk, an optical disk, a magnetooptical disk, or a semiconductor memory. The removal recording medium, for example, is a DVD media, an HD-DVD media, a Blu-ray media, a compact flash (registered trademark), a memory stick, an SD memory card, or the like. The removal recording medium, for example, may be an IC card on which a noncontact IC chip is mounted, an electronic device, or the like.

With the above configuration described above, the audio signal receiving apparatus 20 can acquire audio signals from the audio signal transmitting apparatus 10 through the external apparatus communication unit 221, and can perform interactive data communication with the audio signal transmitting apparatus 10.

An example of the hardware configuration which can realize the function of the audio signal receiving apparatus 20 according to the embodiment is described above. The constituent elements may be configured by using general-purpose members or may include hardware specialized for the functions of the constituent elements. Therefore, depending on a technological level obtained each time the embodiment is executed, hardware configurations to be used can be arbitrarily changed.

<About Configuration of Audio Signal Transmitting Apparatus 10>

Figure 4:
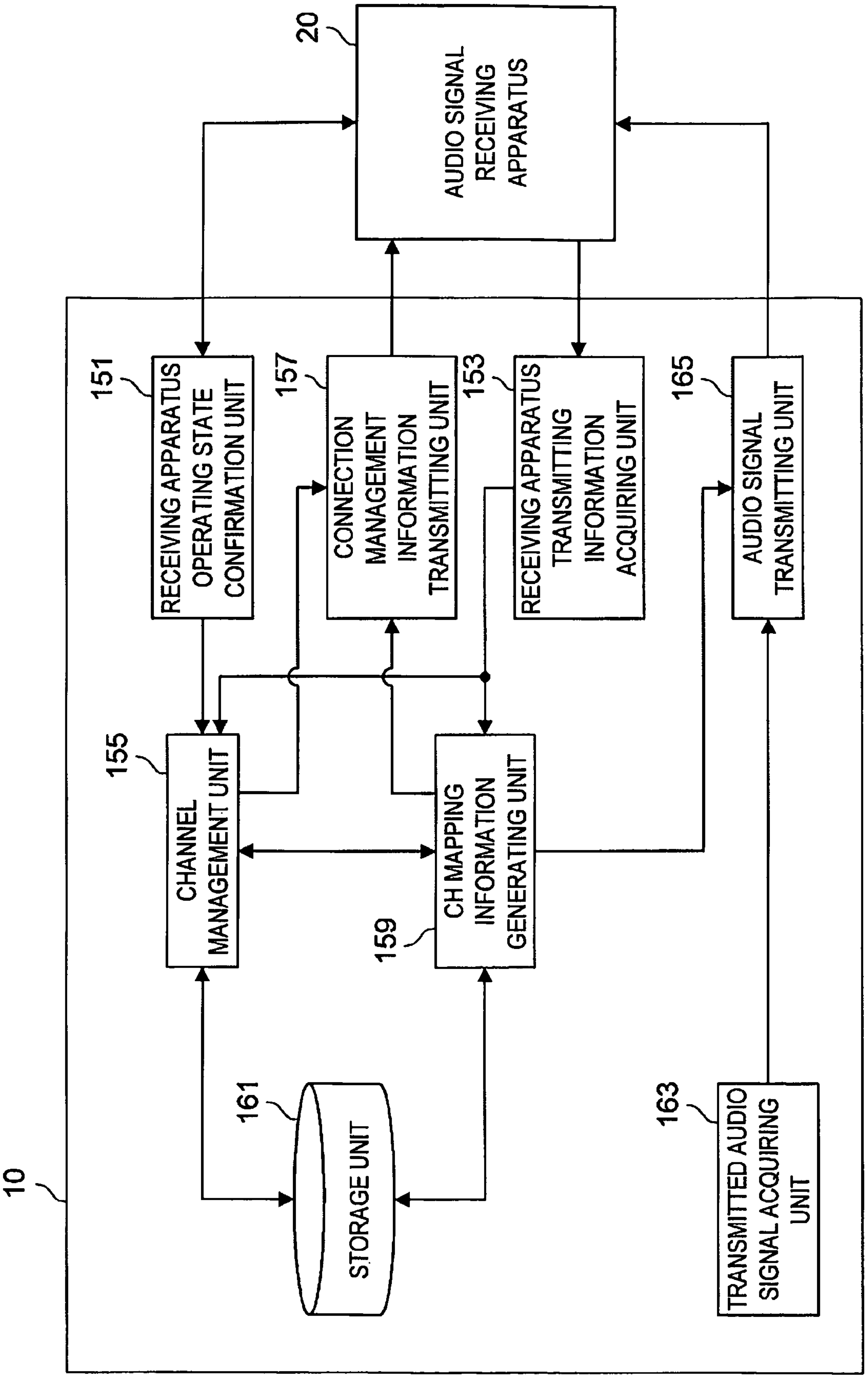
FIG. 4 is a block diagram showing a functional configuration of the audio signal transmitting apparatus according to the embodiment.

Subsequently, with reference to FIG. 4, a configuration of the audio signal transmitting apparatus 10 according to the embodiment will be described below in detail. FIG. 4 is a block diagram for explaining a configuration of the audio signal transmitting apparatus 10 according to the embodiment.

As shown in FIG. 4, the audio signal transmitting apparatus 10 according to the embodiment mainly includes a receiving apparatus operating state confirmation unit 151, a receiving apparatus transmitting information acquiring unit 153, a channel management unit 155, a connection management information transmitting unit 157, a channel mapping information generating unit 159, a storage unit 161, a transmitted audio signal acquiring unit 163, and an audio signal transmitting unit 165.

The receiving apparatus operating state confirmation unit 151 which is an example of the external apparatus transmitting information acquiring unit includes, for example, a CPU, a ROM, a RAM, an EEPROM, an external apparatus communication unit, and the like and confirms the presence/absence and operation state of the audio signal receiving apparatus 20 which can be connected to the audio signal transmitting apparatus 10. More specifically, the receiving apparatus operating state confirmation unit 151 transmits operation state confirming signals which confirm the operation states of the audio signal receiving apparatuses 20 at predetermined time intervals (for example, every minute) to all the audio signal receiving apparatuses 20 to confirm the audio signal receiving apparatus 20 which responds. The receiving apparatus operating state confirmation unit 151 determines that the audio signal receiving apparatus 20 which responds is in an operation state, and outputs the result to the channel management unit 155 (will be described later). The receiving apparatus operating state confirmation unit 151 confirms a specific channel, of the plurality of channels which transmit audio signals, from which the audio signal receiving apparatus 20 being in an operation state receives a signal, and outputs the result to the channel management unit 155.

The receiving apparatus transmitting information acquiring unit 153 which is an example of the external apparatus transmitting information acquiring unit includes, for example, a CPU, a ROM, a RAM, an EEPROM, an external apparatus communication unit, and the like, and acquires receiving apparatus transmitting information transmitted from the audio signal receiving apparatus 20. The receiving apparatus transmitting information acquired by the receiving apparatus transmitting information acquiring unit 153 includes, for example, a connection establishment request of the audio signal receiving apparatus 20, a connection cancellation request of the audio signal receiving apparatus 20, a request to desire a type change of an audio signal transmitted from the audio signal transmitting apparatus 10, and the like. The receiving apparatus transmitting information acquiring unit 153 outputs the acquired receiving apparatus transmitting information to the channel management unit 155 and the CH mapping information generating unit 159.

The channel management unit 155 includes, a CPU, a ROM, a RAM, an EEPROM, and the like, and manages the operation states of the audio signal receiving apparatuses 20 transmitted from the receiving apparatus operating state confirmation unit 151, the number of connected audio signal receiving apparatuses 20 for each of the plurality of channels used in transmission of audio signals by the audio signal transmitting apparatus 10 on the basis of the receiving apparatus transmitting information transmitted from the receiving apparatus transmitting information acquiring unit 153, and the like. More specifically, the channel management unit 155 manages using states of the channels (more specifically, the number of audio signal receiving apparatuses 20 which acquire audio signals from the channels) in association with channel mapping information (to be abbreviated as CH mapping hereinafter) (will be described later) depending on the connection establishment requests and the connection cancellation requests of the audio signal receiving apparatuses 20, the request to desire a type change of the audio signals transmitted from the audio signal transmitting apparatus 10, and the operation states of the audio signal receiving apparatuses 20.

In this case, the "channel mapping information" is a set of pieces of information representing the types of the audio signals transmitted through the plurality of channels. The pieces of channel mapping information are roughly classified into two types depending on transmitting schemes of audio signals which can be used by the audio signal transmitting apparatus 10. In this case, the transmitting scheme of the audio signal are schemes which represent ways of using the plurality of channels used in transmission of the audio signals to transmit the audio signals. As the transmitting schemes, two types, i.e., a first transmitting scheme and a second transmitting scheme are present.

The first transmitting scheme is a scheme that allocates and transmits surround signals included in a plurality of audio signals acquired from a single sound source (audio source) to at least one of the plurality of channels. Hereinafter, the first transmitting scheme is also called a "transmitting scheme of surround mode". On the other hand, the second transmitting scheme is a scheme that allocates and transmits audio signals acquired from a plurality of sound sources to a plurality of channels for each of the sound sources. The second transmitting scheme is also called a "transmitting scheme of multi-source mode".

The "channel (CH) mapping information" mentioned here is a set of pieces of information representing the types of the audio signals transmitted through the plurality of channels. As the types of the audio signals, like a type of an audio signal acquired from a DVD or a type of an audio signal or the like acquired from a device connected to a digital input, a type representing a source of an audio signal, as in sub-sound or the like for a sub-woofer, a surround rear speaker or a surround back speaker, a type representing that an audio signal is for surround sound, and the like are known. The details of the channel mapping information (CH mapping information) will be described later.

When the audio signal receiving apparatus 20 is connected to the audio signal transmitting apparatus 10, the channel management unit 155 notifies the audio signal receiving apparatus 20 of the establishment of connection and a transmitting scheme used by the audio signal transmitting apparatus 10 through the connection management information transmitting unit 157.

The connection management information transmitting unit 157 includes, for example, a CPU, a ROM, a RAM, an EEPROM, an external apparatus communication unit, and the like, and transmits connection management information including information representing a transmitting scheme of an audio signal used by the audio signal transmitting apparatus 10, information representing a connection state to the audio signal transmitting apparatus 10 such as connection establishment or connection cancellation which is issued by the channel management unit 155, CH mapping information generated by the CH mapping information generating unit 159 (will be described later), and the like to an external connection apparatus such as the audio signal receiving apparatus 20. In this case, the connection management information means information related to connection to the audio signal transmitting apparatus 10 such as reception of audio signals transmitted from the audio signal transmitting apparatus 10 as described above, connection establishment or connection cancellation of which the audio signal transmitting apparatus 10 notifies and information representing the transmitting scheme of the audio signal used by the audio signal transmitting apparatus 10. The transmission of the connection management information may be performed to all the external connection apparatuses regardless of whether connection is established, or may be performed to only an external connection apparatus which gives notice of a transmitting request of the connection management information. With respect to transmission of the CH mapping information, the connection management information transmitting unit 157 may voluntarily transmit the CH mapping information generated by the CH mapping information generating unit 159 when the CH mapping information generating unit 159 transmits the CH mapping information. The connection management information transmitting unit 157 may additionally transmit new CH mapping information when data communication with an external connection apparatus occurs.

The CH mapping information generating unit 159 includes, for example, a CPU, a ROM, a RAM, an EEPROM, an external apparatus communication unit, and the like, and generates new CH mapping information as needed when the receiving apparatus transmitting information acquiring unit 153 notifies the CH mapping information generating unit 159 of a change request of an audio signal. In generation of the new CH mapping information, the CH mapping information generating unit 159 dynamically generates CH mapping information to reflect a change of a connection state of the audio signal receiving apparatus 20 which is an external connection apparatus, and various request from the audio signal receiving apparatus 20 with reference to, for example, various databases stored in the storage unit 161, various pieces of information transmitted from the receiving apparatus transmitting information acquiring unit 153 and the channel management unit 155, and the like. The generated new CH mapping information is output to the channel management unit 155, the connection management information transmitting unit 157, and the audio signal transmitting unit 165. The generated new CH mapping information may be recorded on the storage unit 161.

In the storage unit 161, for example, information related to a transmitting scheme of an audio signal which can be used by the audio signal transmitting apparatus 10, a database in which types or the like of audio signals configuring the CH mapping information are recorded, various pieces of transmitting information which can be transmitted to the audio signal receiving apparatus 20, various programs and various processing methods used by the audio signal transmitting apparatus 10 according to the embodiment, and the like are stored. In the storage unit 161, an audio signal itself may be recorded.

In addition to the database and the program, the audio signal transmitting apparatus 10 can arbitrarily store various parameters which need to be stored in execution of some process, intermediate steps of the process, and the like in the storage unit 161. In the storage unit 161, processing units configuring the audio signal transmitting apparatus 10 such as the receiving apparatus operating state confirmation unit 151, the receiving apparatus transmitting information acquiring unit 153, the channel management unit 155, the connection management information transmitting unit 157, the CH mapping information generating unit 159, the transmitted audio signal acquiring unit 163, and the audio signal transmitting unit 165 can freely write data.

The transmitted audio signal acquiring unit 163 includes, for example, a CPU, a ROM, a RAM, an EEPROM, an external apparatus communication unit, and the like, and acquires an audio signal output from the audio signal output device 12 and uses the audio signal to be transmitted to the audio signal receiving apparatus 20. The transmitted audio signal acquiring unit 163 can also acquire the audio signal from the storage unit 161 when the audio signal is recorded on the storage unit 161. The audio signal acquired by the transmitted audio signal acquiring unit 163 is transmitted to the audio signal transmitting unit 165 (will be described later). The audio signal acquired by the transmitted audio signal acquiring unit 163 may be stored in the storage unit 161.

The audio signal transmitting unit 165 includes, for example, a CPU, a ROM, a RAM, an EEPROM, an external apparatus communication unit, and the like, and distributes audio signals to channels and transmits the audio signals to the audio signal receiving apparatus 20 on the basis of the CH mapping information transmitted from the CH mapping information generating unit 159. In order to match with types of (attributes of audio signals) of the audio signals in the channels described in the CH mapping information, when an audio signal to be transmitted needs to be converted, the audio signal transmitting unit 165 performs a predetermined converting process to the audio signal to be transmitted and transmits the converted audio signal. In this case, when, for example, audio signals which are not converted are audio signals corresponding to a 5.1 ch system, as the converting process, a process of down-mixing the audio signal into a normal 2-channel audio signal may be used.

In the audio signal transmitting apparatus 10 according to the embodiment, transmission of an audio signal to an external connection apparatus or interactive communication with the external connection apparatus may be performed by wireless transmission, PCL, or wired transmission. However, the transmission and the interactive communication are preferably performed by wireless transmission.

An example of the functions of the audio signal transmitting apparatus 10 according to the embodiment is described above. The constituent elements described above may be configured by using general-purpose members or circuits, or may include hardware specialized for the functions of the constituent elements. The functions of the constituent elements may be entirely performed by the CPU or the like. Therefore, depending on a technological level obtained each time the embodiment is executed, configurations to be used can be arbitrarily changed.

(About Channel Mapping Information)

With reference to FIGS. 5A and 5B, channel mapping information generated by the audio signal transmitting apparatus 10 according to the embodiment will be described below in detail. FIGS. 5A and 5B are explanatory diagrams for explaining an example of the channel mapping information according to the embodiment.

The CH mapping information generated by the audio signal transmitting apparatus 10 according to the embodiment is regulated as a set of pieces of information representing types of audio signals allocated to a plurality of channels (CHs) which can transmit at least two stereo signals (in other words, at least 4-channel monaural signals), respectively.

FIGS. 5A and 5B show an example of CH mapping information allocated to the channels which can transmit four stereo signals (in other words, 8-channel monaural signals). In FIGS. 5A and 5B, as is apparent from these drawings, a frame which can cope with two monaural signals is arranged for one channel, and the types of a total of 8 audio signals are regulated.

In the audio signal transmitting apparatus 10 according to the embodiment, pieces of CH mapping information of two types, i.e., CH mapping information as shown in FIG. 5A and CH mapping information as shown in FIG. 5B can be generated.

In the CH mapping information shown in FIG. 5A, one pair of main channels are set to channel 1, and sub-channels corresponding to the main channels are set to channel 2 to channel 4. In this case, the main channel corresponds to a source of an audio signals corresponding to a main sound of, for example, a DVD, and a sub-channel means an audio signal such as a surround sound of, for example, a DVD, corresponding to the main channel.

To the sub-channels shown in FIG. 5A, for example, various sub-channels of signals such as an audio signal for subwoofer, an audio signal for center speaker, an audio signal for surround rear speaker, an audio signal for surround back speaker, and the like can be allocated. For example, a case in which as the audio signal receiving apparatus 20, a center speaker, a surround rear speaker, and a surround back speaker are connected to the audio signal transmitting apparatus 10, and sub-channels of the audio signal for center speaker, the audio signal for surround speaker, and an audio signal for surround back speaker, corresponding to the same contents as that of main contents, are allocated will be considered. In this case, the audio signal transmitting apparatus 10 outputs the audio signal of the main channel, and the audio signal receiving apparatus 20, i.e., the center speaker, the surround rear speaker, and the surround back speaker output audio signals of the corresponding sub-channels.

As shown in FIG. 5A, the CH mapping information including the channel to which the main channel is allocated and the channel to which the sub-channel is allocated is called CH mapping information of a "surround mode" hereinafter. The "CH mapping information of surround mode" is CH mapping information corresponding to the "transmitting scheme of surround mode". In the CH mapping information shown in FIG. 5A, only one channel to which a main channel is allocated is present. However, two or more channels to which main channels are allocated may be present.

On the other hand, in CH mapping information shown in FIG. 5B, main channels are allocated to four channels, respectively, and a channel to which the sub-channel is allocated is not present. This corresponds to a case in which a CD sound source, a DVD sound source, a tuner sound source, and a digital input source are allocated to channel 1, channel 2, channel 3, and channel 4, respectively.

As shown in FIG. 5B, the CH mapping information in which main channels are allocated to the plurality of channels, respectively is called CH mapping information of a "multi-source mode" hereinafter. The "CH mapping information of surround mode" is CH mapping information corresponding to the "transmitting scheme of multi-source mode". The CH mapping information of multi-source mode, as shown in FIG. 5B, does not include a channel to which a surround component is allocated.

The audio signal transmitting apparatus 10 can generate any one of the pieces of CH mapping information in a surround mode and a multi-source mode (in other words, whether any one of the transmitting scheme of surround mode and the transmitting scheme of multi-source mode can be used) depending on the audio signal transmitting apparatus 10. Therefore, the audio signal transmitting apparatus 10 dedicated to the surround mode does need to be present, and the audio signal transmitting apparatus 10 dedicated to the multi-source mode may be present. The audio signal transmitting apparatus 10 capable of coping with both modes may be present.

When any channel of the CH mapping information is matched with an identification type allocated to the audio signal receiving apparatus, the audio signal receiving apparatus 20 according to the embodiment can output an audio signal allocated to the matched channel.

More specifically, when the identification type allocated to the audio signal receiving apparatus 20 is a "surround rear speaker", the audio signal receiving apparatus 20 can output an audio signal having a type "surround rear speaker" described in the CH mapping information.

<About Configuration of Audio Signal Receiving Apparatus 20>

Figure 6:
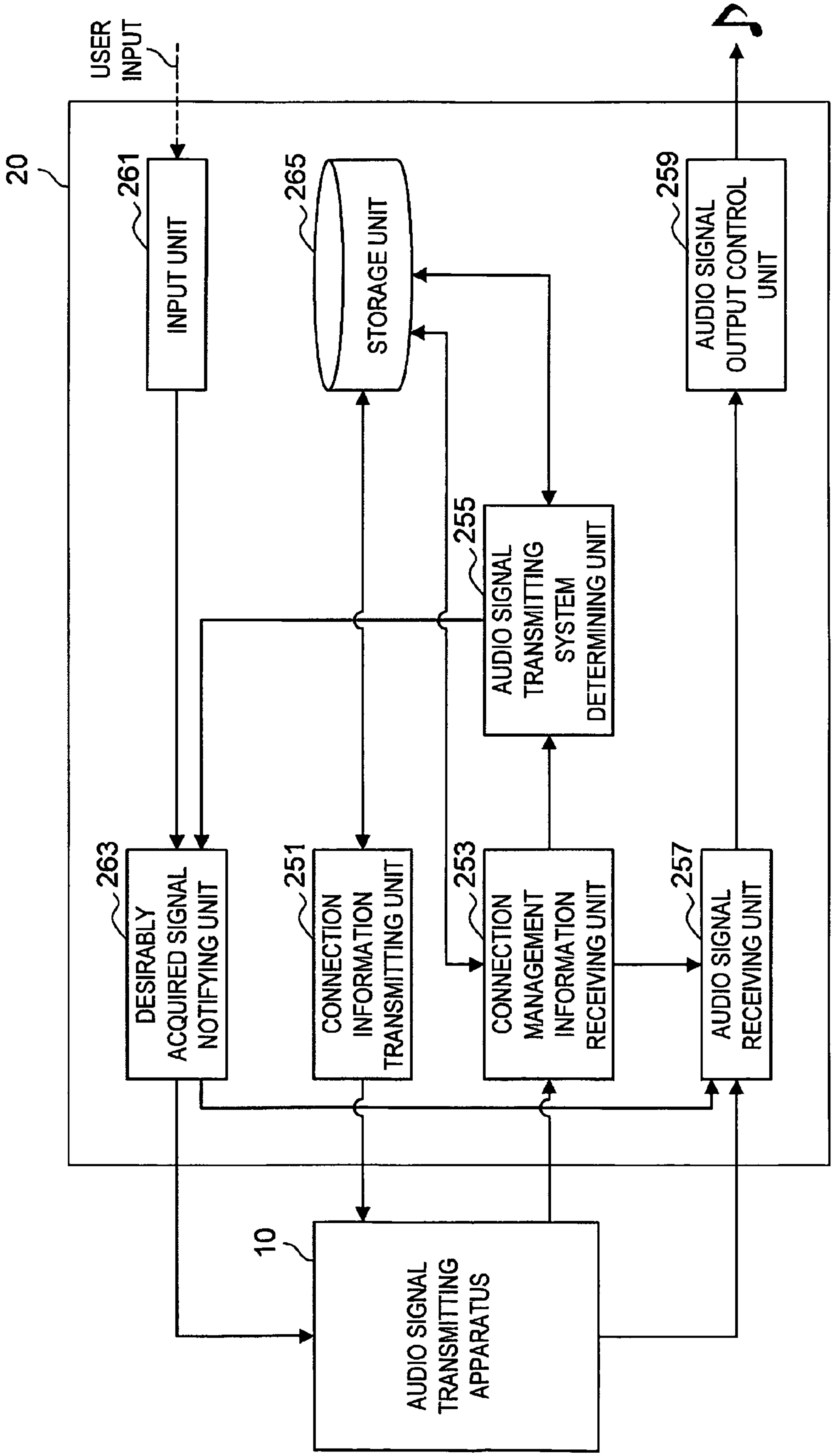
FIG. 6 is a block diagram for explaining a configuration of an audio signal receiving apparatus according to the embodiment.

Subsequently, a configuration of the audio signal receiving apparatus 20 according to the embodiment will be described below in detail with reference to FIG. 6. FIG. 6 is a block diagram for explaining the configuration of the audio signal receiving apparatus 20 according to the embodiment.

As shown in FIG. 6, the audio signal receiving apparatus 20 according to the embodiment mainly includes a connection information transmitting unit 251, a connection management information receiving unit 253, an audio signal transmitting scheme determining unit 255, an audio signal receiving unit 257, an audio signal output control unit 259, an input unit 261, a desirably acquired signal notifying unit 263, and a storage unit 265.

The connection information transmitting unit 251, for example, includes a CPU, a ROM, a RAM, an EEPROM, an external apparatus communication unit, and the like, and transmits connection information to change a connection state between the audio signal receiving apparatus 20 and the audio signal transmitting apparatus 10 to audio signal transmitting apparatus 10. In this case, as the connection information to change connection states, for example, a connection establishment request of the audio signal receiving apparatus 20 to the audio signal transmitting apparatus 10, a connection cancellation request of the audio signal receiving apparatus 20 to the audio signal transmitting apparatus 10, information which notifies of an ON/OFF state of a power supply of the audio signal receiving apparatus 20, and the like can be given.

When the connection information transmitting unit 251 transmits the connection information to the audio signal transmitting apparatus 10, the connection information transmitting unit 251 may also transmit an identifier or the like to specify the audio signal receiving apparatus 20.

The connection management information receiving unit 253, for example, includes a CPU, a ROM, a RAM, an EEPROM, an external apparatus communication unit, and the like, and receives information related to a transmitting scheme used by the audio signal transmitting apparatus 10, the CH mapping information transmitted from the audio signal transmitting apparatus 10, information related to types of the audio signal transmitting apparatus 10, a connection establishment notice or a connection cancellation notice notified by the audio signal transmitting apparatus 10, and the like. The received connection management information is transmitted to the audio signal transmitting scheme determining unit 255 and the audio signal receiving unit 257 (will be described later). The connection management information receiving unit 253 may record the received connection management information on the storage unit 265.

The audio signal transmitting scheme determining unit 255 includes, for example, a CPU, a ROM, a RAM, an EEPROM, and the like, and determines a transmitting scheme of an audio signal used in the audio signal transmitting apparatus 10 connected to the audio signal receiving apparatus 20 with reference to the information related to the transmitting scheme of the audio signal received by the connection management information receiving unit 253, the CH mapping information, and the like. More specifically, the audio signal transmitting scheme determining unit 255 determines any one of the transmitting scheme of surround mode and the transmitting scheme of multi-source mode used by the audio signal transmitting apparatus 10 with reference to the information related to the transmitting scheme of the received audio signal and the CH mapping information. The audio signal transmitting scheme determining unit 255 transmits the determination result to the desirably acquired signal notifying unit 263 (will be described later). The audio signal transmitting scheme determining unit 255 may record the determination result on the storage unit 265 to make it possible to refer to the processing units of the audio signal receiving apparatus 20.

The audio signal receiving unit 257 includes, for example, a CPU, a ROM, a RAM, an EEPROM, an external apparatus communication unit, and the like, and receives an audio signal transmitted from the audio signal transmitting apparatus 10 on the basis of the CH mapping information or the like transmitted from the connection management information receiving unit 253. The audio signal receiving unit 257 may record the received audio signal on the storage unit 265.

The audio signal output control unit 259 includes, for example, a CPU, a ROM, a RAM, an EEPROM, and the like, and performs output control of an audio signal output unit arranged in the audio signal receiving apparatus 20.

The input unit 261 includes, for example, a CPU, a ROM, a RAM, an EEPROM, a key operation unit, and the like, and converts an operation performed by a user to the key operation unit (for example, an audio signal switching button) or the like of the audio signal receiving apparatus 20 into an input signal to notify the desirably acquired signal notifying unit 263 (will be described later) of the input signal. As the operation performed by the user to the audio signal receiving apparatus 20, for example, an operation (for example, an operation or the like which changes a CD output transmitted by the audio signal transmitting apparatus 10 into a DVD output) which changes an audio signal output from the audio signal receiving apparatus 20 into an audio signal is given.

The desirably acquired signal notifying unit 263 includes, for example, a CPU, a ROM, a RAM, an EEPROM, an external apparatus communication unit, and the like, and notifies the audio signal transmitting apparatus 10 of information related to a user operation transmitted from the input unit 261. In the notification of a desirably acquired signal, the desirably acquired signal notifying unit 263 determines whether the desirably acquired signal notifying unit 263 notifies the audio signal transmitting apparatus 10 of information related to the desirably acquired signal on the basis of the determination result of the transmitting scheme transmitted from the audio signal transmitting scheme determining unit 255.

In this case, when the transmitting scheme used by the audio signal transmitting apparatus 10 is the transmitting scheme of surround mode, audio signals transmitted through the plurality of channels originate from a single sound source. For this reason, the desirably acquired signal notifying unit 263 needs to notify the audio signal transmitting apparatus 10 of the information related to the desirably acquired signal. On the other hand, when the transmitting scheme used by the audio signal transmitting apparatus 10 is the transmitting scheme of multi-source mode, audio signals originating from a plurality of sound sources are transmitted to the plurality of channels, respectively. For this reason, other audio signals can be acquired without notifying the audio signal transmitting apparatus 10. More specifically, the desirably acquired signal notifying unit 263 requests the audio signal receiving unit 257 to receive a new audio signal without notifying the audio signal transmitting apparatus 10 of the information, and the audio signal receiving unit 257 receives audio signals allocated to other channels on the basis of the CH mapping information of which the audio signal transmitting apparatus 10 notifies.

The audio signal receiving apparatus 20 according to the embodiment notifies the audio signal transmitting apparatus

10 of the information as needed, so that a user can change audio signals output from the audio signal receiving apparatus 20.

In the storage unit 265, for example, a database on which a type or the like of an audio signal configuring CH mapping information is recorded, various pieces of information which can be transmitted to the audio signal transmitting apparatus 10, various programs and processing methods used by the audio signal receiving apparatus 20 according to the embodiment are stored.

Furthermore, the storage unit 265 can appropriately store various parameters, intermediate steps of processing which need to be stored, in addition to the database and the programs, when the audio signal receiving apparatus 20 performs any process. In the storage unit 265, processing units configuring the audio signal receiving apparatus 20 such as the connection information transmitting unit 251, the connection management information receiving unit 253, the audio signal transmitting scheme determining unit 255, the audio signal receiving unit 257, the audio signal output control unit 259, and the desirably acquired signal notifying unit 263 can freely write data.

In the audio signal receiving apparatus 20 according to the embodiment, reception of an audio signal transmitted from the audio signal transmitting apparatus 10 and interactive communication with the audio signal transmitting apparatus 10 may be performed by wireless transmission, PLC or wired transmission. However, the reception and the communication are preferably performed by wireless transmission.

An example of the function of the audio signal receiving apparatus 20 according to the embodiment has been described above. The constituent elements may be configured by using general-purpose members or may include hardware specialized for the functions of the constituent elements. All the functions of the constituent elements may be performed by a CPU or the like. Therefore, depending on a technological level obtained each time the embodiment is executed, configurations to be used can be arbitrarily changed.

(Connecting Process of Audio Signal Receiving Apparatus)

Figure 7:
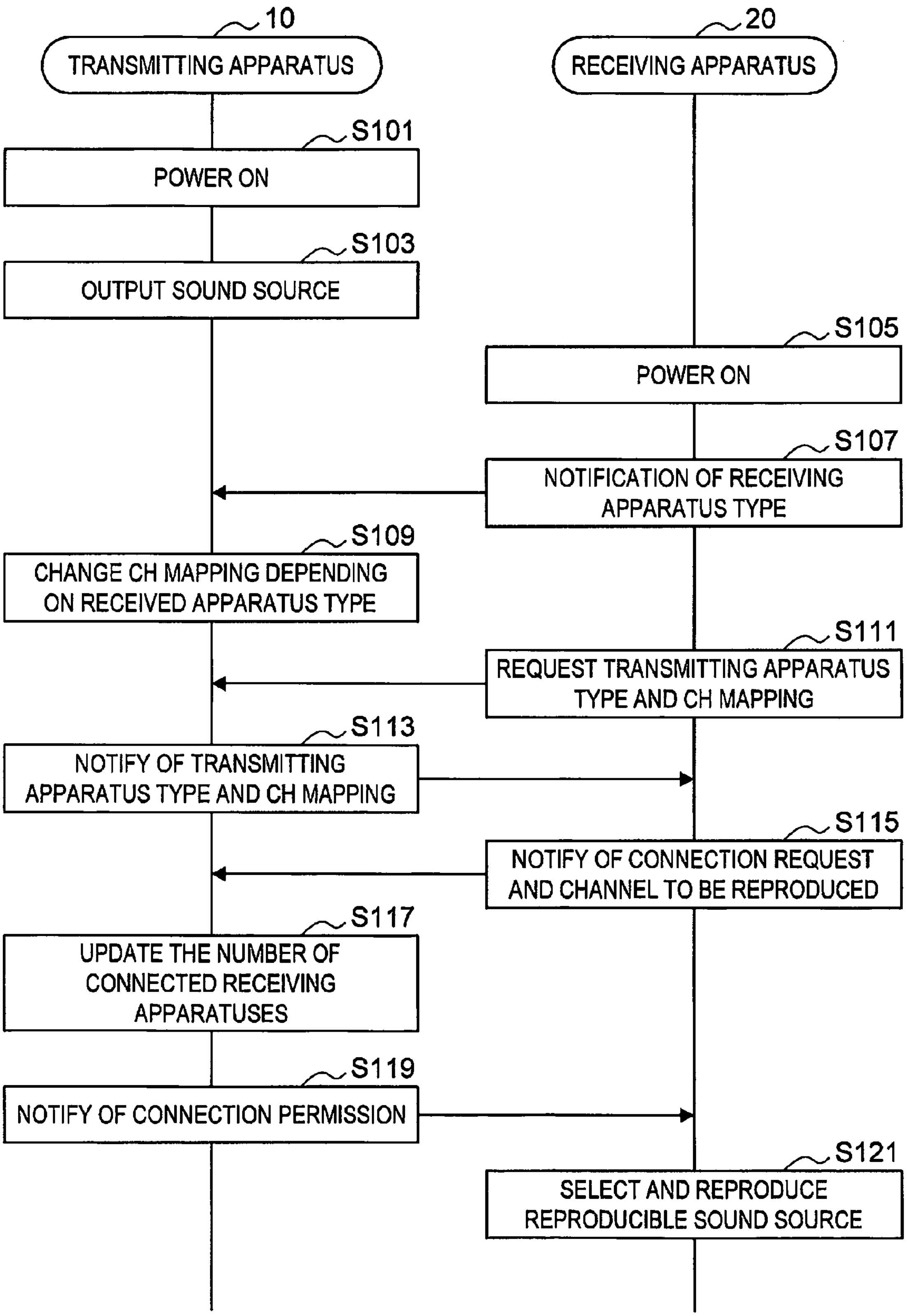
FIG. 7 is a flow chart for explaining a connecting process of the audio signal receiving apparatus according to the embodiment.

Subsequently, with reference to FIG. 7, a connecting process of the audio signal receiving apparatus 20 to the audio signal transmitting apparatus 10 will be described below in detail. FIG. 7 is a flow chart showing a flow of the connecting process of the audio signal receiving apparatus according to the embodiment.

A connecting process between the audio signal transmitting apparatus 10 and the audio signal receiving apparatus 20 will be described below in detail with reference to FIG. 7.

When the power supply of the audio signal transmitting apparatus 10 is turned on by a user (step S101), the audio signal transmitting apparatus 10 starts an output of a sound source through the audio signal output unit arranged in the audio signal transmitting apparatus 10 (step S103).

At a certain point of time, when a power supply of the audio signal receiving apparatus 20 is turned on by a user (step S105), the audio signal receiving apparatus 20 notifies the audio signal transmitting apparatus 10 of a receiving apparatus type (for example, whether the audio signal receiving apparatus 20 is an audio component or an audio signal acquiring device) through the connection information transmitting unit 251 with reference to the storage unit 265 or the like (step S107).

In the audio signal transmitting apparatus 10, the receiving apparatus transmitting information acquiring unit 153 receives a receiving apparatus type notice from the audio signal receiving apparatus 20 and transmits received contents to the channel management unit 155. The channel management unit 155 determines whether the audio signal receiving apparatus 20 can be connected to the audio signal transmitting apparatus 10, and the CH mapping information generating unit 159 generates new CH mapping information (step S109).

Next, the audio signal receiving apparatus 20 notifies the audio signal transmitting apparatus 10 of the type of the audio signal transmitting apparatus 10 (for example, whether the audio signal transmitting apparatus 10 is an apparatus which permits CH mapping information of the surround mode or an apparatus which permits CH mapping information of the multi-source mode) and an acquiring request of the CH mapping information used by the audio signal transmitting apparatus 10 at the present (step S111).

When the receiving apparatus transmitting information acquiring unit 153 of the audio signal transmitting apparatus 10 receives the acquiring request, the connection management information transmitting unit 157 transmits the type of the audio signal transmitting apparatus 10 and the CH mapping information to the audio signal receiving apparatus 20 (step S113).

The audio signal receiving apparatus 20 which receives the type of the transmitting apparatus 10 and the CH mapping information notifies the audio signal transmitting apparatus 10 of a connection establishment request to the audio signal transmitting apparatus 10 and a channel to be desirably reproduced (step S115).

In the audio signal transmitting apparatus 10 which receives the connection establishment request from the audio signal receiving apparatus 20, the number of audio signal receiving apparatuses 20 the connections of which are established in the connection state management unit 155 updates (step S117). The audio signal transmitting apparatus 10 notifies the audio signal receiving apparatus 20 of the effect (connection establishment notice) that the connection is permitted (step S119).

In the audio signal receiving apparatus 20 which establishes a connection to the audio signal transmitting apparatus 10, a reproducible sound source is selected to reproduce an audio signal (step S121).

By the procedures described above, the audio signal receiving apparatus 20 is connected to the audio signal transmitting apparatus 10. In the connecting process according to the embodiment, since the audio signal receiving apparatus 20 starts the connecting process to the audio signal transmitting apparatus 10 the moment the power supply is turned on without waiting for an operation by a user, a user of the audio signal receiving apparatus 20 can easily perform connection to the audio signal transmitting apparatus 10.

(Connection Confirming Process of Audio Signal Transmitting Apparatus)

Figure 8:
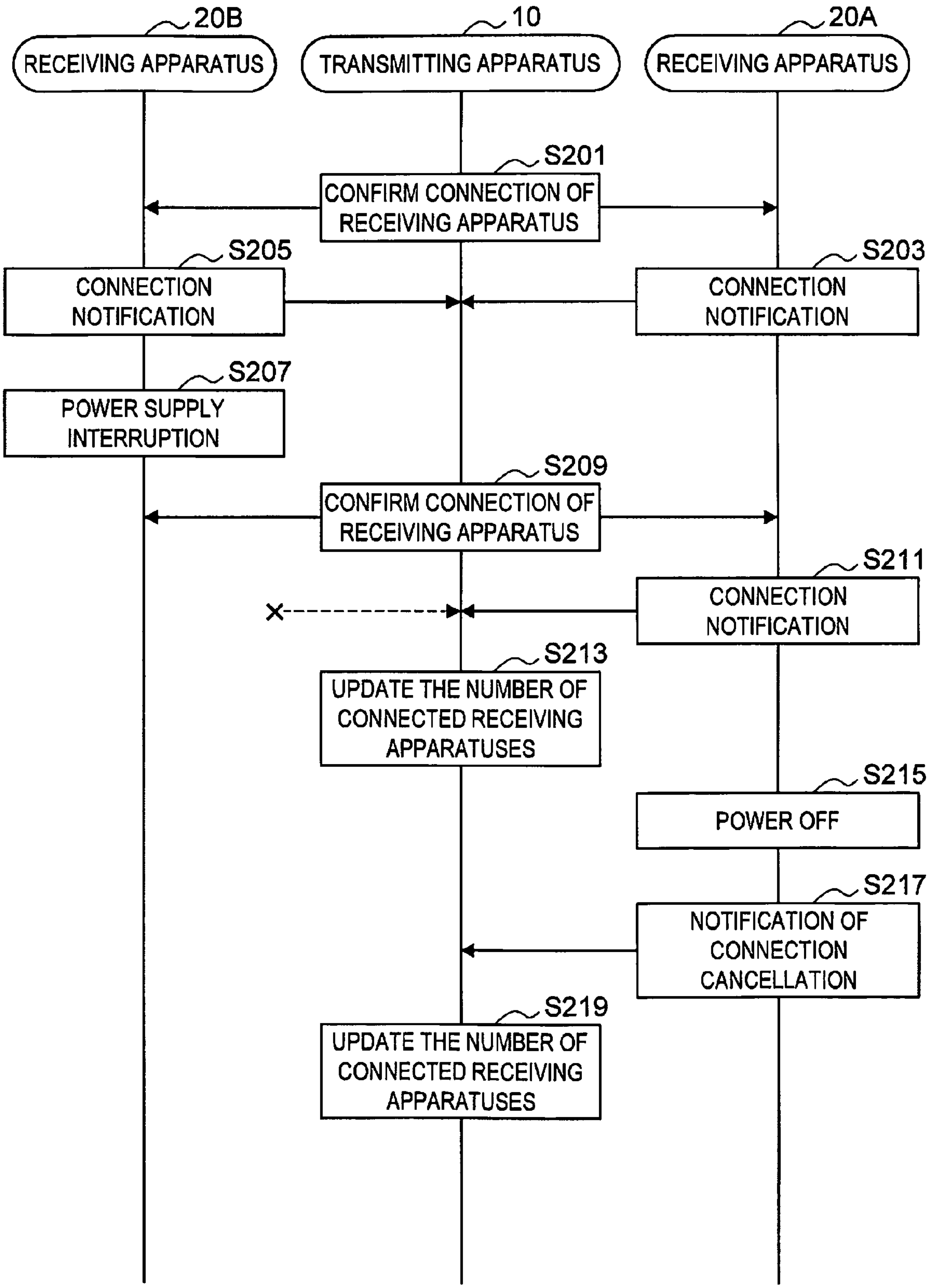
FIG. 8 is a flow chart for explaining a connection confirming process of the audio signal transmitting apparatus according to the embodiment.

A connection confirming process of the audio signal receiving apparatus 20 which is executed by the audio signal transmitting apparatus 10 will be described below in detail with reference to FIG. 8. FIG. 8 is a flow chart showing a flow of the connection confirming process executed by the audio signal transmitting apparatus 10 according to the embodiment.

The audio signal transmitting apparatus 10, as described above, performs connection confirmation to the audio signal receiving apparatus 20 at predetermined intervals to determine whether the connection to the audio signal receiving apparatus 20 is maintained. The connection confirming process will be described below in detail. In the following explanation, two audio signal receiving apparatuses 20A and 20B are connected to the audio signal transmitting apparatus 10.

The receiving apparatus operating state confirmation unit 151 of the audio signal transmitting apparatus 10 transmits an operation state confirming signal to confirm operation states of the connected audio signal receiving apparatuses 20A and 20B (step S201). The audio signal receiving apparatus which receives the operation state confirming signal responds to the received operation state confirming signal to notify the audio signal transmitting apparatus 10 that the corresponding audio signal receiving apparatus is connected (step S203 and S205).

When the audio signal transmitting apparatus 10 receives the response from the audio signal receiving apparatus 20, the audio signal transmitting apparatus 10 performs the process of maintaining a connection state. For this reason, the channel management unit 155 does not change the connection state, and the CH mapping information generating unit 159 does not generate new CH mapping information.

In this state, it is considered that, at a certain point of time, a power supplied to the audio signal receiving apparatus 20B is interrupted (step S207) to turn off the power supply of the audio signal receiving apparatus 20B.

A predetermined period of time (for example, about 1 minute) has elapsed after a previous operation state confirming signal is transmitted (in FIG. 8, a point of time of step S201), the audio signal transmitting apparatus 10 transmits the next operation state confirming signal to confirm the connections of the audio signal receiving apparatuses 20A and 20B (step S209).

In this case, although the audio signal receiving apparatus 20A responds to a connection notice (step S211), the audio signal receiving apparatus 20B in which the power supply is cut off and turned off does not responds to the connection notice.

Since the audio signal receiving apparatus 20B the connection relationship of which is maintained in previous confirmation does not have a response, the audio signal transmitting apparatus 10 cancels the connection to the audio signal receiving apparatus 20, and the channel management unit 155 updates the number of audio signal receiving apparatuses being in a connection state (step S213).

Thereafter, the power supply is turned off through authentic processes by the user of the audio signal receiving apparatus 20A (step S215), the audio signal receiving apparatus 20A transmits a connection cancellation notice from the connection information transmitting unit 251 to the audio signal transmitting apparatus 10 as part of the shutdown process (step S217), and the power supply of the audio signal receiving apparatus 20A is turned off.

In the audio signal transmitting apparatus 10, in response to the connection cancellation notice from the audio signal receiving apparatus 20A, the audio signal transmitting apparatus 10 cancels the connection with the audio signal receiving apparatus 20A, and the channel management unit 155 updates the number of audio signal receiving apparatuses in connection states (step S219).

In the audio signal transmission system 1 according to the embodiment, since the processes are automatically performed at predetermined time intervals, maintenance or cancellation of connection between the audio signal transmitting apparatus 10 and the audio signal receiving apparatus 20 can be automatically processed.

<About Change Request Process of Audio Signal>

Figure 9:
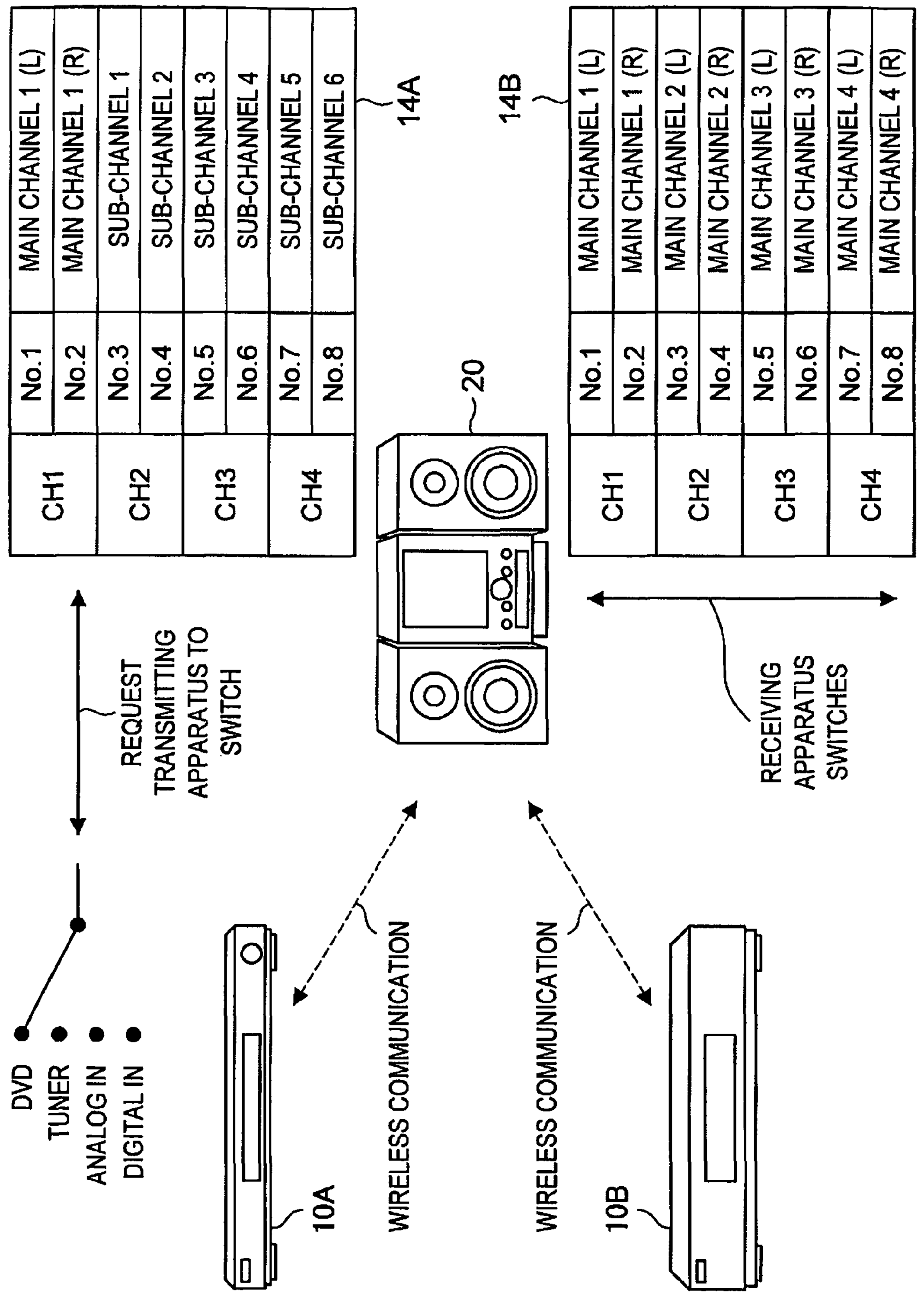
FIG. 9 is an explanatory diagram for explaining a channel changing process in the audio signal transmission system according to the embodiment.
Figure 10:
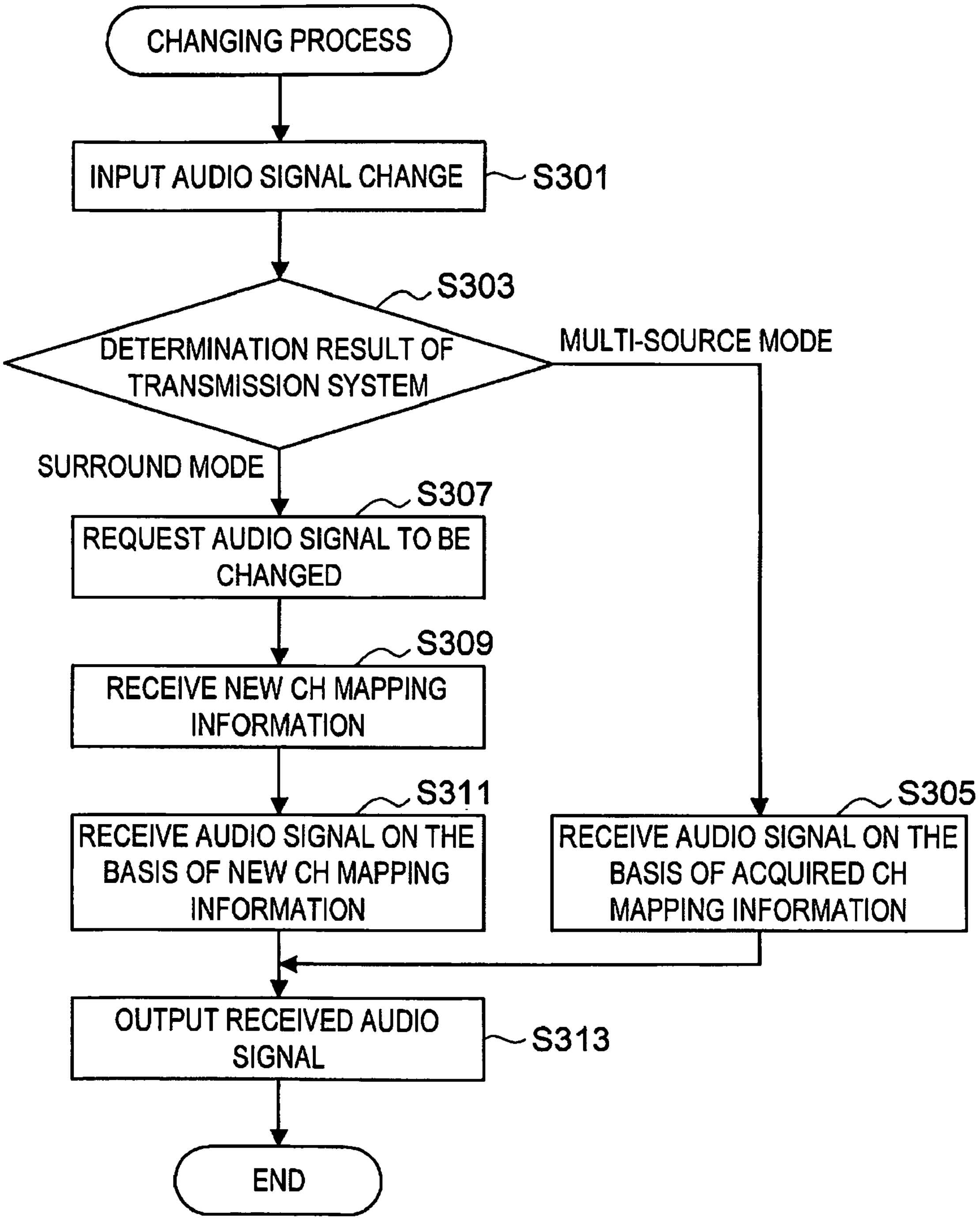
FIG. 10 is a flow chart for explaining the channel changing process in the audio signal transmission system according to the embodiment.

Subsequently, with reference to FIGS. 9 and 10, a change request process of an audio signal performed by the audio signal receiving apparatus 20 will be described below in detail. FIG. 9 is an explanatory diagram for explaining a channel changing process in the audio signal transmission system 1 according to the embodiment, and FIG. 10 is a flow chart for explaining a channel changing process in the audio signal transmission system 1 according to the embodiment.

In the audio signal transmission system 1 according to the embodiment, the audio signal receiving apparatus 20 automatically determines a transmitting scheme of an audio signal employed by the audio signal transmitting apparatus 10. As a result, when a user of the audio signal receiving apparatus 20 designates a changing process of an audio signal which is reproduced, the audio signal receiving apparatus 20 selects processing contents depending on the determined transmitting scheme of the audio signal. In this manner, although the user of the audio signal receiving apparatus 20 only performs a predetermined operation, the audio signal receiving apparatus 20 can perform an appropriate process depending on the type of the audio signal transmitting apparatus 10. The change request process of the audio signal will be described below in detail with reference to FIG. 9.

[In Case of Audio Signal Transmitting Apparatus Corresponding to Surround Mode]

A case in which the audio signal receiving apparatus 20 acquires an audio signal from an audio signal transmitting apparatus 10A using the transmitting scheme (first transmitting scheme) of surround mode will be described below.

When the audio signal receiving apparatus 20 is wirelessly connected to the audio signal transmitting apparatus 10A by using, for example, a radio wave, the audio signal transmitting apparatus 10A transmits information related to a transmitting scheme used by the audio signal transmitting apparatus 10A and CH mapping information 14A to the audio signal receiving apparatus 20. The audio signal transmitting scheme determining unit 255 determines the transmitting scheme used by the audio signal transmitting apparatus 10A on the basis of the transmitted information related to the transmitting scheme.

In this case, since information representing that the used transmitting scheme is the transmitting scheme of surround mode is transmitted from the audio signal transmitting apparatus 10A, the audio signal transmitting scheme determining unit 255 determines that the audio signal transmitting apparatus 10A serving as a main unit is an apparatus corresponding to the surround mode. The determination result, for example, can be confirmed by referring to the transmitted CH mapping information 14A.

In the apparatus corresponding to the surround mode, for example, as shown in FIG. 9, of a 4-channel transmitting line, a main channel is allocated to one channel (monaural 2 channels), and the 3 remaining channels serve as sub-channels to which surround components derived from the main channel are allocated.

In this case, when a user of the audio signal receiving apparatus 20 designates the audio signal receiving apparatus 20 to change a received audio signal (more specifically, an audio signal reproduced by the audio signal receiving apparatus 20) through a key operation unit such as a switching button, the desirably acquired signal notifying unit 263 of the audio signal receiving apparatus 20 notifies the audio signal transmitting apparatus 10A of a change request of the audio signal.

In the audio signal transmitting apparatus 10A, for example, when an audio signal allocated to channel 1 at the present is a signal acquired from a DVD, an audio signal is acquired from another sound source (audio source) such as a tuner, an analog input, or a digital input, and CH mapping information is updated. More specifically, the audio signals allocated to channel 1 are sequentially changed to cope with switching button operations performed by the user of the audio signal receiving apparatus 20. In the audio signal receiving apparatus 20, the audio signals are acquired and reproduced on the basis of the CH mapping information of which the audio signal receiving apparatus 20 is newly notified, so that the process is executed in response to the signal switching designation of the user.

When the CH mapping information of the surround mode has a plurality of main channels, the audio signal transmitting apparatus 10A can also switch audio signals by using a plurality of main channels. In this case, the audio signal transmitting apparatus 10A transmits channel information (in other words, channel information related to a channel to which the audio signal receiving apparatus 20 can be connected) related to a location of a channel (channel to which the main channel is allocated) which should acquire an audio signal to the audio signal receiving apparatus 20. The audio signal receiving apparatus 20 changes audio signals to be received on the basis of the received channel information and the CH mapping information.

[In Case of Audio Signal Transmitting Apparatus Corresponding to Multi-Source Mode]

A case in which the audio signal receiving apparatus 20 acquires an audio signal from an audio signal transmitting apparatus 10B using the transmitting scheme (second transmitting scheme) of multi-source mode will be described below.

When the audio signal receiving apparatus 20 wirelessly connected to the audio signal transmitting apparatus 10B by using, for example, a radio wave, the audio signal transmitting apparatus 10B transmits information related to a transmitting scheme used by the audio signal transmitting apparatus 10B and CH mapping information 14B to the audio signal receiving apparatus 20. The audio signal transmitting scheme determining unit 255 of the audio signal receiving apparatus 20 determines the transmitting scheme used by the audio signal transmitting apparatus 10B on the basis of the transmitted information related to the transmitting scheme.

In this case, since information representing that the used transmitting scheme is the transmitting scheme of multi-source mode is transmitted from the audio signal transmitting apparatus 10B, the audio signal transmitting scheme determining unit 255 determines that the audio signal transmitting apparatus 10B serving as a main unit is an apparatus corresponding to the multi-source mode. The determination result, for example, can be confirmed by referring to the transmitted CH mapping information 14B.

In the apparatus corresponding to the multi-source mode, for example, as shown in FIG. 9, of a 4-channel transmitting line, audio signals acquired from different sound sources are allocated as main channels, respectively.

In this case, when a user of the audio signal receiving apparatus 20 designates the audio signal receiving apparatus 20 to change a received audio signal (more specifically, an audio signal reproduced by the audio signal receiving apparatus 20) through a key operation unit such as a switching button, the desirably acquired signal notifying unit 263 of the audio signal receiving apparatus 20 responds to the designation of the user without notifying the audio signal transmitting apparatus 10B of a change request of the audio signal.

More specifically, in the audio signal transmitting apparatus 10B corresponding to the multi-source mode, the audio signals acquired from the different sound sources are allocated to all the four channels. For this reason, when channels from which audio signals are acquired are only changed in the audio signal receiving apparatus 20, the process is consequently executed in response to the signal switching designation of the user.

Although the audio signals of all the channels are sequentially received in response to the signal switching designation of the user, when a signal switching designation is input by the user, the desirably acquired signal notifying unit 263 of the audio signal receiving apparatus 20 confirms the presence/absence (more specifically, in the case shown in FIG. 9, the presence/absence of an audio signal acquired from the fifth sound source) of an audio signal which is not transmitted yet by the audio signal transmitting apparatus 10B in the audio signal transmitting apparatus 10B.

When the information representing that the audio signal which is not transmitted yet is present is transmitted from the audio signal transmitting apparatus 10B, the desirably acquired signal notifying unit 263 notifies the audio signal transmitting apparatus 10B of a change request of an audio signal. When the audio signal transmitting apparatus 10B receives the notice, the audio signal transmitting apparatus 10B acquires an audio signal from a new sound source (the fifth sound source in FIG. 9) and updates the CH mapping information. In updating of the CH mapping information, for example, a signal allocated to any one of the channels is changed, and the signals allocated to the remaining channels are used without being updated. Subsequently, the audio signal transmitting apparatus 10B transmits the new CH mapping information and channel information related to a channel to be connected to the audio signal receiving apparatus 20. When the audio signal receiving apparatus 20 acquires and reproduces an audio signal on the basis of the CH mapping information of which the audio signal receiving apparatus 20 is newly notified and the channel information, the process is consequently executed in response to the signal switching designation of the user.

When information representing that the audio signal which is not transmitted yet is absent is received from the audio signal transmitting apparatus 10B, the audio signal receiving apparatus 20 executes a switching process of channels which receives an audio signal again on the basis of the CH mapping information 14B of which the audio signal receiving apparatus 20 is notified without notifying the audio signal transmitting apparatus 10B of a change request of an audio signal.

[About Audio Signal Change Request Process of Audio Signal Receiving Apparatus 20]

Subsequently, an audio signal change request process executed by the audio signal receiving apparatus 20 will be described below with reference to FIG. 10.

When a user of the audio signal receiving apparatus 20 operates the key operation unit such as a switching button to designate a change of an audio signal (step S301), the desirably acquired signal notifying unit 263 of the audio signal receiving apparatus 20 confirms a determination result of which the audio signal transmitting scheme determining unit 255 notifies (step S303) to check whether a transmitting scheme of the audio signal transmitting apparatus 10 which acquires the audio signal is of the surround mode or the multi-source mode.

When the transmitting scheme of the audio signal transmitting apparatus 10 serving as a main unit is of the multi-source mode, the desirably acquired signal notifying unit 263 does not notify the audio signal transmitting apparatus 10 of a desire to change the audio signal from the first, and the audio signal receiving unit 257 receives another audio signal on the basis of the already acquired CH mapping information (step S305).

When the transmitting scheme of the audio signal transmitting apparatus 10 serving as a main unit is of the surround mode, the desirably acquired signal notifying unit 263 notifies the audio signal transmitting apparatus 10 of a desire to change the audio signal (step S307). In the notified audio signal transmitting apparatus 10, new CH mapping information is generated and transmitted to the audio signal receiving apparatus 20. The audio signal receiving apparatus receives the CH mapping information of which the audio signal receiving apparatus 20 is notified (step S309) and receives other audio signals on the basis of the received new CH mapping information (step S311).

Upon completion of the reception of the other audio signals, the audio signal receiving apparatus 20 outputs the received audio signals (step S313). When the user of the audio signal receiving apparatus 20 further operates the switching button, the audio signal receiving apparatus 20 repeats the above steps to cope with the operation.

[About Updating of CH Mapping Information in Audio Signal Transmitting Apparatus]

In the changing process of the audio signals, when the CH mapping information needs to be updated in the audio signal transmitting apparatus 10, the audio signal transmitting apparatus 10 can change channels for performing an updating process depending on the number of audio signal receiving apparatuses 20 which acquire audio signals from the channels.

In the audio signal transmitting apparatus 10, the channel management unit 155 recognizes the number of audio signal receiving apparatuses 20 which acquire the audio signals from the channels. For this reason, the audio signal transmitting apparatus 10 can perform the process on the basis of the number of connected audio signal receiving apparatuses 20 managed by the channel management unit 155.

Figure 11:
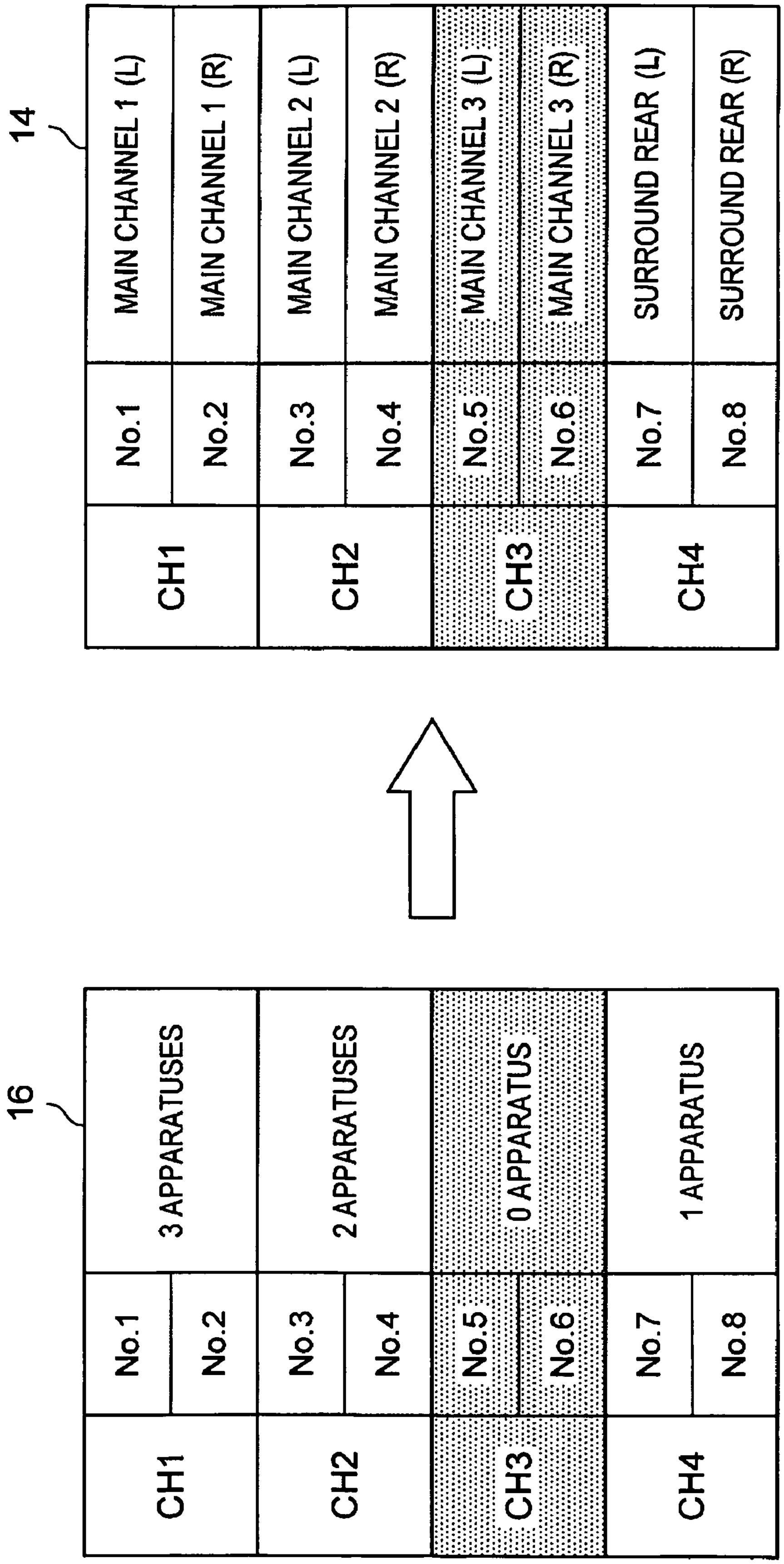
FIG. 11 is an explanatory diagram for explaining the channel changing process in the audio signal transmission system according to the embodiment.

For example, as shown in FIG. 11, when, a connection state 16 of the channels, 3 apparatuses, 2 apparatuses, 0 apparatus, and one apparatus are connected in channel 1, channel 2, channel 3, and channel 4, respectively, the CH mapping information generating unit 159 acquires the information from the channel management unit 155 and updates the CH mapping information such that the number of audio signal receiving apparatuses influenced by the change of the CH mapping information is minimum. More specifically, when a connection state as shown in FIG. 11 is given, the CH mapping information generating unit 159 changes the CH mapping information of channel 3 in which the number of apparatuses is 0.

When the audio signal receiving apparatuses 20 are connected to all the channels, a channel changing process with respect to the channel having the minimum number of connected audio signal receiving apparatuses 20. When only one connected audio signal receiving apparatus 20 is connected in a channel (more specifically, when only the audio signal receiving apparatus 20 which notifies of a change request is connected), the CH mapping information is changed with respect to the channel.

The number of audio signal receiving apparatuses 20 influenced by the change of the CH mapping information can be reduced with these processes.

As described above, in the audio signal transmission system 1 according to the embodiment, in addition to transmission of an audio signal, interactive data communication between the transmitting apparatus 10 and the receiving apparatus 20 is performed. When a main channel which can be used in the audio signal receiving apparatus 20 serving as a sub-unit only one channel (more specifically, even though the audio signal transmitting apparatus 10 is an apparatus corresponding to the surround mode), the audio signal transmitting apparatus 10 serving as a main unit is requested to be switched to make it possible to change sound sources (audio sources) of the main unit.

Regardless of the transmitting scheme of the audio signal transmitting apparatus 10 serving as the main unit, a user of the audio signal receiving apparatus 20 can switch audio sources with a channel switching button or the like. For this reason, the user can perform the operation without considering the type (apparatus corresponding to the surround mode or apparatus corresponding to the multi-source mode) of the audio signal transmitting apparatus 10 serving as a main unit. Therefore, the audio signal receiving apparatus 20 can be operated more easily.

It should be understood by those skilled in the art that various modifications, combinations, sub-combinations and alterations may occur depending on design requirements and other factors insofar as they are within the scope of the appended claims or the equivalents thereof.

For example, the embodiments described above describe the case in which a 4-channel stereo system including 4 channels is used. However, the number of channels is not limited to the number described above, and 4 or more channels may be used. Since the number of settable channels depends on the processing capability of a CPU or a DSP arranged in the audio signal transmitting apparatus or the audio signal receiving apparatus, the numbers of channels can be changed depending on the processing capabilities of these processors.

What is claimed is:

1. An audio signal receiving apparatus which receives audio signals transmitted from external connection apparatuses through a plurality of channels, comprising:

a connection management information receiving unit which receives connection management information including channel mapping information representing a type of an audio signal transmitted by an external connection apparatus among the external connection apparatuses;

an audio signal transmitting scheme determining unit which determines a transmitting scheme of the audio signal in the external connection apparatus based on the channel mapping information;

an audio signal receiving unit which receives the audio signal from the external connection apparatus based on the channel mapping information; and a desirably acquired signal notifying unit which notifies the external connection apparatus of a change request of the audio signal, wherein when the transmitting scheme of the audio signal is a first transmitting scheme which allocates and transmits a surround signal included in a plurality of audio signals acquired from a single sound source to at least one of the plurality of channels in a change of the audio signal, the desirably acquired signal notifying unit which notifies the external connection apparatus of the change request of the audio signal transmitted by a channel which transmits the audio signal acquired from the single sound source, and when the transmitting scheme of the audio signal is a second transmitting scheme which allocates and transmits audio signals acquired from a plurality of sound sources to the plurality of channels of each of the sound sources in the change of the audio signal, the audio signal receiving unit changes the channels of the audio signals received from the external connection apparatus.

2. The audio signal receiving apparatus according to claim 1, wherein the connection management information receiving unit receives channel information related to the channel to which the audio signal receiving unit can be connected from the external connection apparatus, and the audio signal receiving unit acquires the audio signal based on the channel mapping information and the channel information.

3. The audio signal receiving apparatus according to claim 1, wherein when the audio signal is changed, after the audio signal receiving unit confirms all the audio signals transmitted through the plurality of channels, the desirably acquired signal notifying unit communicates with the external connection apparatus to confirm the presence/absence of an audio signal which is not transmitted yet by the external connection apparatus, the desirably acquired signal notifying unit notifies the external connection apparatus of a change request of the audio signals transmitted through the plurality of channels when the audio signal which is not transmitted yet is present, and the audio signal receiving unit may change the channels of the audio signals received from the external connection apparatus when the audio signal which is not transmitted yet is absent.

4. An audio signal transmission system comprising: an audio signal transmitting apparatus which transmits audio signals to external connection apparatuses through a plurality of channels; and an audio signal receiving apparatus which receives the audio signals transmitted from the audio signal transmitting apparatus, wherein the audio signal transmitting apparatus includes:

a connection management information transmitting unit which transmits connection management information including channel mapping information representing types of the audio signals transmitted through the plurality of channels to an external connection apparatus connected to the audio signal transmitting apparatus and including the audio signal receiving apparatus;

an external connection apparatus transmitting information acquiring unit which receives external connection apparatus transmitting information transmitted from the external connection apparatus;

a channel mapping information generating unit which generates the channel mapping information which reflects the external connection apparatus transmitting information based on the external connection apparatus transmitting information; and an audio signal transmitting unit which transmits the audio signal to an external connection apparatus connected to the audio signal transmitting apparatus depending on the channel mapping information, the audio signal receiving apparatus includes:

a connection management information receiving unit which receives connection management information including channel mapping information representing a type of the audio signal transmitted by the external connection apparatus from the external connection apparatus;

an audio signal transmitting scheme determining unit which determines a transmitting scheme of the audio signal in the external connection apparatus based on the channel mapping information;

an audio signal receiving unit which receives the audio signal from the external connection apparatus based on the channel mapping information; and a desirably acquired signal notifying unit which notifies the external connection apparatus of a change request of the audio signal, when the transmitting scheme of the audio signal is a first transmitting scheme which allocates and transmits a surround signal included in a plurality of audio signals acquired from a single sound source to at least one of the plurality of channels in a change of the audio signal, the desirably acquired signal notifying unit which notifies the audio signal transmitting apparatus of a change request of the audio signal transmitted by a channel which transmits the audio signal acquired from the single sound source, and when the transmitting scheme of the audio signal is a second transmitting scheme which allocates and transmits audio signals acquired from a plurality of sound sources to the plurality of channels of each of the sound sources in the change of the audio signal, the audio signal receiving unit changes the channels of the audio signals received from the audio signal transmitting apparatus.

* * * * *